US011934353B2

(12) United States Patent
Suzuki et al.

(10) Patent No.: US 11,934,353 B2
(45) Date of Patent: Mar. 19, 2024

(54) STORAGE SYSTEM INCLUDING ENCODER

(71) Applicant: Hitachi, Ltd., Tokyo (JP)

(72) Inventors: Akifumi Suzuki, Tokyo (JP); Takahiro Naruko, Tokyo (JP); Hiroaki Akutsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 17/105,059

(22) Filed: Nov. 25, 2020

(65) Prior Publication Data

US 2021/0165764 A1  Jun. 3, 2021

(30) Foreign Application Priority Data

Nov. 29, 2019 (JP) ................................. 2019-217442

(51) Int. Cl.
G06F 16/174 (2019.01)
G06N 3/08 (2023.01)

(52) U.S. Cl.
CPC ........... *G06F 16/1744* (2019.01); *G06N 3/08* (2013.01)

(58) Field of Classification Search
CPC .............................. G06F 16/1744; G06N 3/08
See application file for complete search history.

(56) References Cited

U.S. PATENT DOCUMENTS 5,134,396 A * 7/1992 Sirat .................... G06F 18/2135
341/51
10,476,520 B2 * 11/2019 Arelakis ................. G06F 3/064
2002/0097172 A1 * 7/2002 Fallon .................. H03M 7/4006
341/51
2007/0174536 A1   7/2007 Nakagawa et al.
2007/0233477 A1 * 10/2007 Halowani ............... H03M 7/30
704/232
2018/0277068 A1 * 9/2018 Diederich ................ G09G 5/39
2019/0251418 A1   8/2019 Nakanishi et al.
2019/0279051 A1   9/2019 Martinello et al.
2020/0304147 A1 * 9/2020 Choi ..................... H04L 1/0009

(Continued)

FOREIGN PATENT DOCUMENTS

JP   2007199891 A   8/2007
JP   2019-160303 A   9/2019
WO  2018/189613 A1  10/2018

OTHER PUBLICATIONS

Yuta Fukushima et al., "Design and Evaluation of Distributed Deep Learning in Wireless Sensor Network" Transactions of Information Processing Society of Japan [online], Japan, Information Processing Society of Japan, Jan. 15, 2019, vol. 60, No. 1, pp. 2-15. with partial translation.

(Continued)

*Primary Examiner* — Hosain T Alam
*Assistant Examiner* — Robert F May
(74) *Attorney, Agent, or Firm* — Procopio, Cory, Hargreaves & Savitch LLP

(57) ABSTRACT

To reduce a calculation processing load as a whole while realizing a small amount of data loss for at least one of compression and decompression. For each of a plurality of pieces of data, a storage system determines a compression operation scale of the data based on a feature of the data, executes a lossy compression operation according to the determined compression operation scale to covert the data into encoded data, and stores the encoded data or compressed data thereof into a storage device.

13 Claims, 13 Drawing Sheets

(56) References Cited

U.S. PATENT DOCUMENTS

2020/0327701 A1* 10/2020 Zhou .................... G06T 3/4046
2023/0237770 A1* 7/2023 Sombatsiri ........... G06V 10/454
  382/190

OTHER PUBLICATIONS

Japanese Patent Office, Office Action dated Jun. 6, 2023 directed to the JP counterpart application No. 2019-217442 with English machine translation, in 10 pages.

* cited by examiner

FIG. 8

| COMPRESSION/DECOMPRESSION SETTING | | |
|---|---|---|
| SETTING OF ENCODER | | |
| NUMBER OF OUTPUT Ch IN FIRST-STAGE CONVOLUTION LAYER | XXX | 801 |
| NUMBER OF ROUTES IN WHICH NUMBER OF OUTPUT Ch IS HIGH IN SECOND-STAGE CONVOLUTION LAYER | XXX | 802 |
| NUMBER OF ROUTES IN WHICH NUMBER OF OUTPUT Ch IS LOW IN SECOND-STAGE CONVOLUTION LAYER | XXX | 803 |
| HIGH NUMBER OF Ch | XXX | 804 |
| LOW NUMBER OF Ch | XXX | 805 |
| NUMBER OF OUTPUT Ch IN THIRD-STAGE CONVOLUTION LAYER | XXX | 806 |
| SETTING OF DECODER | | |
| NUMBER OF OUTPUT Ch IN FIRST-STAGE TRANSPOSED CONVOLUTION LAYER | XXX | 811 |
| NUMBER OF ROUTES IN WHICH NUMBER OF OUTPUT Ch IS HIGH IN SECOND-STAGE TRANSPOSED CONVOLUTION LAYER | XXX | 812 |
| NUMBER OF ROUTES IN WHICH NUMBER OF OUTPUT Ch IS LOW IN SECOND-STAGE TRANSPOSED CONVOLUTION LAYER | XXX | 813 |
| HIGH NUMBER OF Ch | XXX | 814 |
| LOW NUMBER OF Ch | XXX | 815 |

800

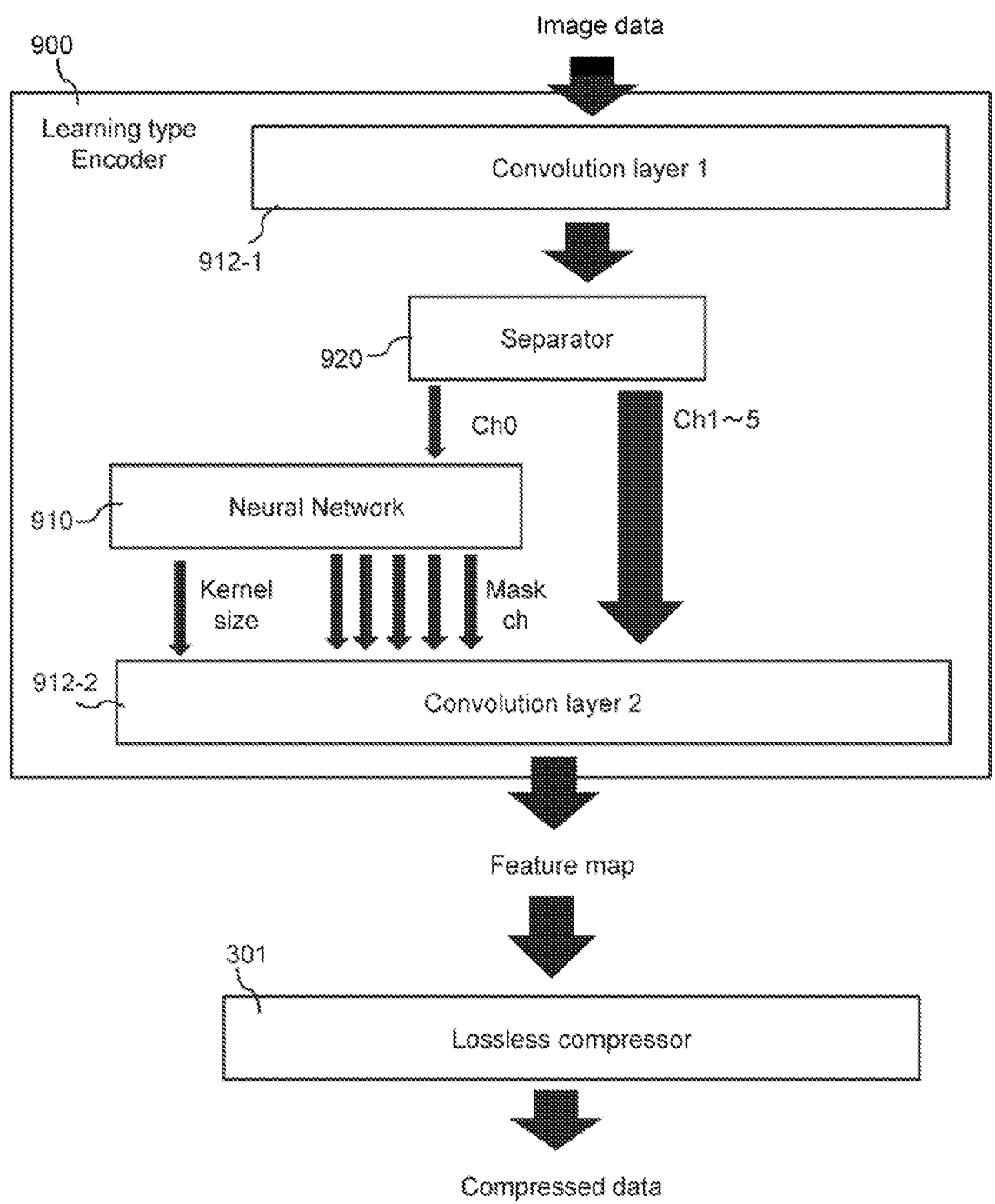

STORAGE SYSTEM INCLUDING ENCODER

BACKGROUND OF THE INVENTION

1. Field of the Invention

The present invention generally relates to storage control including compression.

2. Description of the Related Art

A storage system for reducing the amount of data has been known (for example, JP-A-2007-199891). In general, this type of storage system reduces the amount of data by compression. As one of existing compression methods, a method of converting a character string having a high appearance frequency into a dictionary in a predetermined block unit and replacing the character string with a code having a smaller size, like a run-length method, has been known.

In recent years, a learning type lossy compression technology, in addition to such a general-purpose data compression method, has appeared.

For example, it is possible to create an encoder and a decoder specialized in compression and decompression of data in the same field as learning data by constructing an encoder and a decoder which include a neural network, and learning the encoder and the decoder using data in a specific field as an input. Such an encoder and a decoder have a small amount of data loss due to lossy compression and a large amount of data reduction (higher compression ratio) than manually designed encoders and decoders. Therefore, the data retention cost (cost according to the storage capacity consumed) can be reduced.

However, the encoder and the decoder which include a neural network have a high calculation processing load in compression and decompression. Accordingly, a lot of time may be required for the compression and decompression processing, an expensive calculation resource such as a central processing unit (CPU) or a graphics processing unit (GPU) having a large number of cores may be required, or power consumption may increase. Therefore, the calculation cost required for the compression and the decompression may increase, and the system cost as a sum of the calculation cost and the data retention cost may not be reduced.

According to study results of the inventors of the present application, one of the reasons that the calculation processing load of the encoder and the decoder which include a neural network is high lies in a structure of a general encoder and decoder in which entire data is uniformly processed. Therefore, the same processing is applied to a monotonous data portion with little change (as an example of photographic data, a data portion showing a portion where "blue sky" is reflected) and a complex data portion with drastic changes (as an example of photographic data, a data portion showing a portion where "a wall with a fine pattern without regularity" is reflected). This is considered to be one of the reasons of the high calculation processing load as a whole.

According to study results of the inventors of the present application, another reason that the calculation processing load of the encoder and the decoder which include a neural network is high lies in that it is required to use a large-scale neural network (with many coupling coefficients to be learned) to enable compression and decompression of diverse pieces of data.

SUMMARY OF THE INVENTION

Accordingly, an object of the invention is to reduce a calculation processing load as a whole while realizing a small amount of data loss for at least one of compression and decompression.

In order to solve the problems described above, for example, problems related to compression, the invention provides a storage system. For each of a plurality of pieces of data acquired from data, the storage system determines a compression operation scale of the data based on a feature of the data, executes a compression operation according to the determined compression operation scale to covert the data into encoded data, and stores the encoded data or compressed data thereof into a storage device.

According to the invention, complex data is compressed on a scale with a relatively high calculation processing load, while simple data is compressed on a scale with a relatively low calculation processing load. As a result, the calculation processing load can be reduced as a whole while realizing a small amount of data loss.

BRIEF DESCRIPTION OF THE DRAWINGS

FIG. 8 is a diagram of a management screen according to the first embodiment.

FIG. 9 is a diagram showing a decoder and a lossless decompressor according to a second embodiment.

DESCRIPTION OF THE PREFERRED EMBODIMENTS

Figure 1:
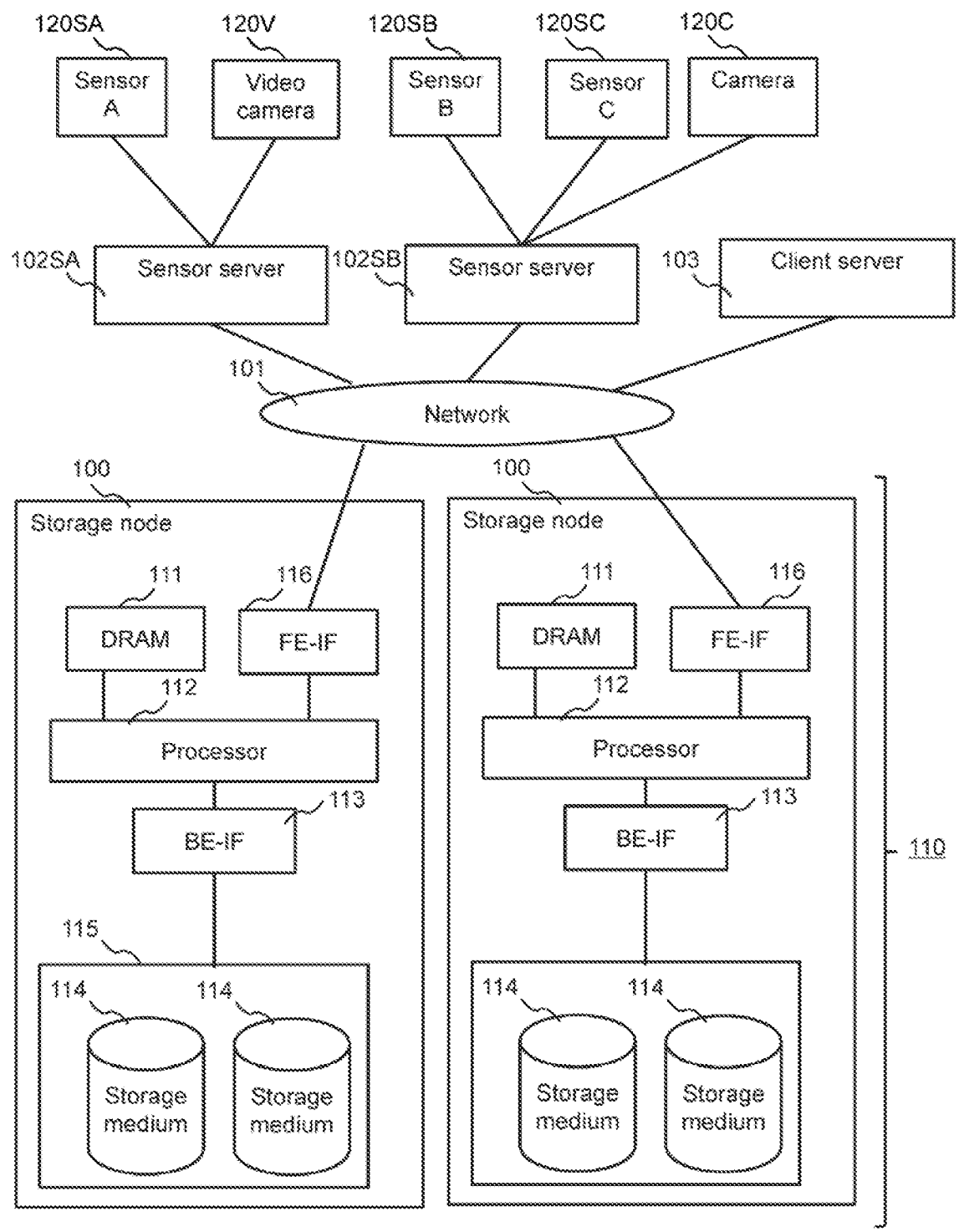
FIG. 1 is a diagram of a system configuration according to a first embodiment.

In the following description, the term "interface device" may be one or more interface devices. The one or more interface devices may be at least one of the following devices.

One or more Input/Output (I/O) interface devices. The Input/Output (I/O) interface device is an interface device for at least one of an I/O device and a remote display computer. The I/O interface device for a display computer may be a communication interface device. At least one I/O device may be a user interface device, for example, either of an input device such as a keyboard and a pointing device, and an output device such as a display device.

One or more communication interface devices. The one or more communication interface devices may be one or more communication interface devices of the same type (for example, may be one or more network interface cards (NICs)), or two or more communication interface devices of different types (for example, an NIC and a host bus adapter (HBA)).

In the following description, the term "memory" may be one or more memory devices, and may be typically a main storage device. At least one memory device in the memory may be a volatile memory device or a non-volatile memory device.

In the following description, the term "persistent storage device" is one or more persistent storage devices. Typically, the persistent storage device is a non-volatile storage device (for example, an auxiliary storage device). Specific examples of the persistent storage device include a hard disk drive (HDD) and a solid state drive (SSD).

In the following description, the term "storage device" may be either the "memory" or the "persistent storage device".

Also, in the following description, the term "processor" is one or more processor devices. Typically, at least one processor device is a microprocessor device such as a central processing unit (CPU). Alternatively, the processor device may be another type of processor device such as a graphics processing unit (GPU). The at least one processor device may be single core or multi-core. The at least one processor device may be a processor core. The at least one processor device may be a processor device in a broad sense such as a hardware circuit (for example, a field-programmable gate array (FPGA) and an application specific integrated circuit (ASIC)) for executing a part of or all processing.

In the following description, the processing may be described using a "program" as a subject. The program is executed by a processor to perform predetermined processing by appropriately using a storage device and/or an interface device. Therefore, the subject of the processing may be a processor (or a device such as a controller including the processor). The program may be installed from a program source into a device such as a computer. The program source may be, for example, a recording medium (for example, a non-transitory recording medium) readable by a program distribution server or a computer. Two or more programs may be implemented as one program, or one program may be implemented as two or more programs in the following description.

In the following description, functions of a learning module, a reasoning module, a setting module, a storage controller, a decoder, an encoder, a lossless compressor, and a lossless decompressor may be implemented by executing one or more computer programs by a processor. When the function is implemented by a processor executing a program, predetermined processing is executed by appropriately using a storage device and/or an interface device, so that the function may be at least a part of the processor. Processing described using the function as a subject may be processing executed by a processor or by a device including the processor. The program may be installed from a program source. The program source may be, for example, a recording medium (for example, a non-transitory recording medium) that can be read by a program distribution computer or a computer. A description for each function is an example, and a plurality of functions may be combined into one function, or one function may be divided into a plurality of functions.

In the following description, a common part in reference numerals may be used when elements of the same type are described without distinction, and a reference numeral may be used when the elements of the same type are distinguished. For example, when sensor servers are not distinguished, the sensor servers may be referred to as a "sensor server 102S", and when the sensor servers are distinguished, the sensor servers may be referred to as a "sensor server 102SA" and a "sensor server 102SB".

Next, some embodiments of the invention will be described with reference to the drawings. The invention is not limited to the embodiments described below.

First Embodiment (1-1) System Configuration

First, a system configuration according to the present embodiment will be described with reference to FIG. 1.

FIG. 1 shows the system configuration according to the first embodiment.

A data source 102, such as a plurality of (or one) sensor servers 102S, and a client server 103 are connected via network 101 to a storage system 110 including a plurality of (or one) storage nodes 100.

Each of the storage nodes 100 includes a DRAM 111 serving as a primary storage area, a processor 112 for executing various processing in accordance with software, a back-end interface device (BE-IF) 113 connected to one or more storage media 114, a persistent storage device 115 (for example, the one or more storage media 114) serving as a secondary storage area, and a front-end interface (FE-IF) 116 connected to the network 101. The BE-IF 113 and the FE-IF 116 are examples of the interface device. The DRAM 111 is an example of the memory. The DRAM 111, the BE-IF 113, and the FE-IF 116 are connected to the processor 112.

The DRAM 111 is connected to the processor 112 in a manner of being capable of accessing the processor 112 in a short time, and is an area for storing a program to be executed or data to be processed by the processor 112.

The processor 112 is a device that operates in accordance with a program to process data. The processor 112 may include a plurality of processor cores therein, and the processor cores may execute the program independently or cooperatively. The processor 112 includes a DRAM controller therein, and the DRAM controller acquires data from the DRAM 111 or stores data into the DRAM 111 in accordance with a request from the processor core. The processor 112 includes an external I/O interface that is connected to the BE-IF 113. The processor 112 can output an instruction to the storage medium 114 via the BE-IF 113. The processor 112 executes various processing described below relating to compression and decompression of data.

In addition to a program for the compression and decompression of data, for example, storage related software such as a software attached storage (SDS) or a Data Base (DB) may operate in the processor 112. A program such as storage related software is executed by the processor 112, so that a function as a storage controller may be implemented. After compressing received data, the processor 112 distributes and stores the compressed data into one or a plurality of storage nodes 100. At this time, the processor 112 stores data into the storage medium 114 under the control of the storage related software such as a SDS or a DB.

The BE-IF 113 is an interface for communicating with the storage medium 114 such as a serial ATA (SATA) drive and a serial attached SCSI (SAS) drive. At the time of writing, the BE-IF 113 acquires data to be written from the DRAM 111 and transfers the data to the storage medium 114, based on an instruction from the processor 112. At the time of reading, the BE-IF 113 acquires data to be read from the storage medium 114 and transfers the data to the DRAM 111, based on an instruction from the processor 112. In the present embodiment, the BE-IF 113 exists independently of the storage medium 114. Alternatively, instead of or in addition to the BE-IF 113, an interface (for example, a non-volatile memory host controller interface (NVMe)) for receiving a direct instruction from the processor 112 may be mounted on the storage medium 114.

The storage medium 119 is a secondary storage device for storing data. The storage medium 114 receives and permanently stores data transmitted from the BE-IF 113 controlled by the processor 112.

The FE-IF 116 is an interface for connecting the storage node 100 to the network 101 connected with another storage node 100 and the data source 102. In an example of FIG. 1, the storage node 100 communicates with the another storage node 100 via the network 101.

The sensor server 102S connected with the storage node 100 via the network 101 is an example of the data source 102. The sensor servers 102SA and 102SB manage a plurality of sensors 120 including a video camera 120V and a camera 120C for a still image, and transfer sensor data (which may include a video and a still image) measured by respective sensors 120 to the storage node 100 via the network 101. Upon receiving the sensor data from the sensor server 102S, the storage node 100 stores, under control of the processor 112, the sensor data compressed through the compression processing described below into the persistent storage device 115.

The client server 103 requests sensor data from the storage node 100 when a user is to use the sensor data stored in the storage node 100. Upon receiving a request from the client server 103, the storage node 100 transfers, under the control of the processor 112, sensor data decompressed through decompression processing described below to the client server 103. The client server 103 may function as an example of the data source 102. For example, the client server 103 may transmit a write request of still-image data or video data to the storage node 100.

The system configuration according to the present embodiment has been described above.

(1-2) Overview of Compression Processing According to Present Embodiment

In the present embodiment, a plurality of data portions are acquired (for example, divided) from the sensor data, and an optimal compression route and an optimal decompression route are selected for each of the plurality of data portions. As a result, the calculation processing load of the compression and the decompression is reduced.

In the following description, in order to facilitate the understanding of the present embodiment, sensor data to be compressed and decompressed is still-image data representing a still image. The still-image data may be data of a photograph captured by the camera 120C for a still image, or may be data of a frame extracted from data of a video captured by the video camera 120V. In the invention, the data that can be compressed or decompressed may be sensor data other than the still image data (for example, may be data of a video, or may be time series data of measured values such as temperature and humidity), or may be data other than the sensor data, instead of or in addition to the still-image data.

In the following description, the still-image data is referred to as a "still image", and each of the plurality of image data portions acquired from the still-image data is referred to as a "partial image".

Figure 2:
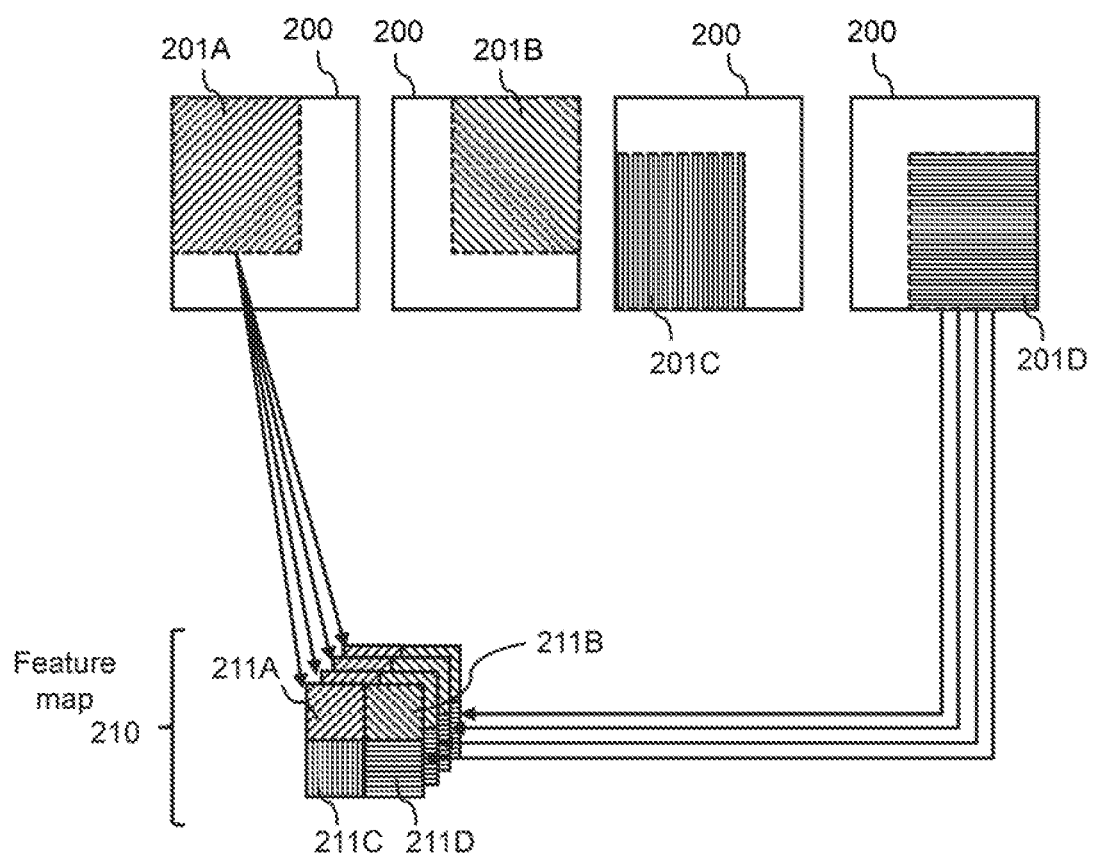
FIG. 2 shows compression processing according to the first embodiment.

FIG. 2 is a diagram conceptually showing the compression of the still-image data according to the present embodiment.

According to the example shown in FIG. 2, the still image 200 is converted into a feature map 210 having a smaller amount of data (the number of elements is small or information entropy is small).

The still image 200 is, for example, three-dimensional (color, width, and height) integer data in the case of color image data. In order to simplify the description, the still image 200 is data of a black and white image having one dimension of color in the example of FIG. 2.

The still image 200 is converted (encoded) into the feature map 210 by an encoder described below.

According to a comparative example, the still image 200 is directly converted into the feature map 210.

On the other hand, in the present embodiment, the encoder acquires a plurality of partial images 201 (four partial images 201A to 201D in the example of FIG. 2) with different locations (image areas) from the still image 200. The still image 200 and the partial images 201 are typically rectangular images. For each partial image 201, a part of the location (image area) covered by one partial image 201 overlaps a part of the location covered by at least one of the other partial images 201. It should be noted that in order to acquire the plurality of partial images 201 from the still image 200, the still image 200 may be divided into a plurality of partial images 201. In other words, a plurality of partial images in which a part of the partial images do not overlap each other may be acquired from the still image.

The encoder has a plurality of compression routes with different compression loads. The encoder converts each partial image 201 into one or more partial feature maps 211 using a kernel. At this time, the partial image 201A is converted into partial feature maps 211A in an optimal compression route in which the partial image 201A is compressed. Similarly, the partial image 201B is converted into partial feature maps 211B by an optimal compression route for compressing the partial image 201B. Accordingly, the partial images 201A to 201D are respectively converted into partial feature maps 211A to partial feature maps 211D by optimal compression routes among a plurality of compression routes.

For example, when most of the partial image 201A is monotonous data such as "blue sky", a selector 311 described below (see, for example, FIGS. 3 and 5) determines that a compression route with a relatively low compression load is optimal, and causes the partial image 201A to be converted into the partial feature maps 211 in the compression route with a relatively low compression load. For example, when the partial image 201B is a complex image, the selector 311 determines that a compression route with a relatively high compression load is optimal, and causes the partial image 201B to be converted into the partial feature maps 211B in the compression route with a relatively high compression load.

Accordingly, the partial image 201, which does not require compression in a compression route with a high compression load, is compressed in a compression route with a lower compression load, so that the still image 200 can be compressed at a lower load (in other words, the still image 200 is compressed at a higher speed) as compared with the comparative example. A plurality of partial images 201 are acquired from one still image 200 in the present embodiment, but the invention is not limited to this example. For example, an encoder for compressing one still image 200 without division, that is, an encoder for selecting a compression route suitable for one still image 200 from a plurality of compression routes may be used.

(1-3) Compression Processing

Next, the compression processing executed by the storage node 100 according to the present embodiment will be described with reference to FIG. 3.

Figure 3:
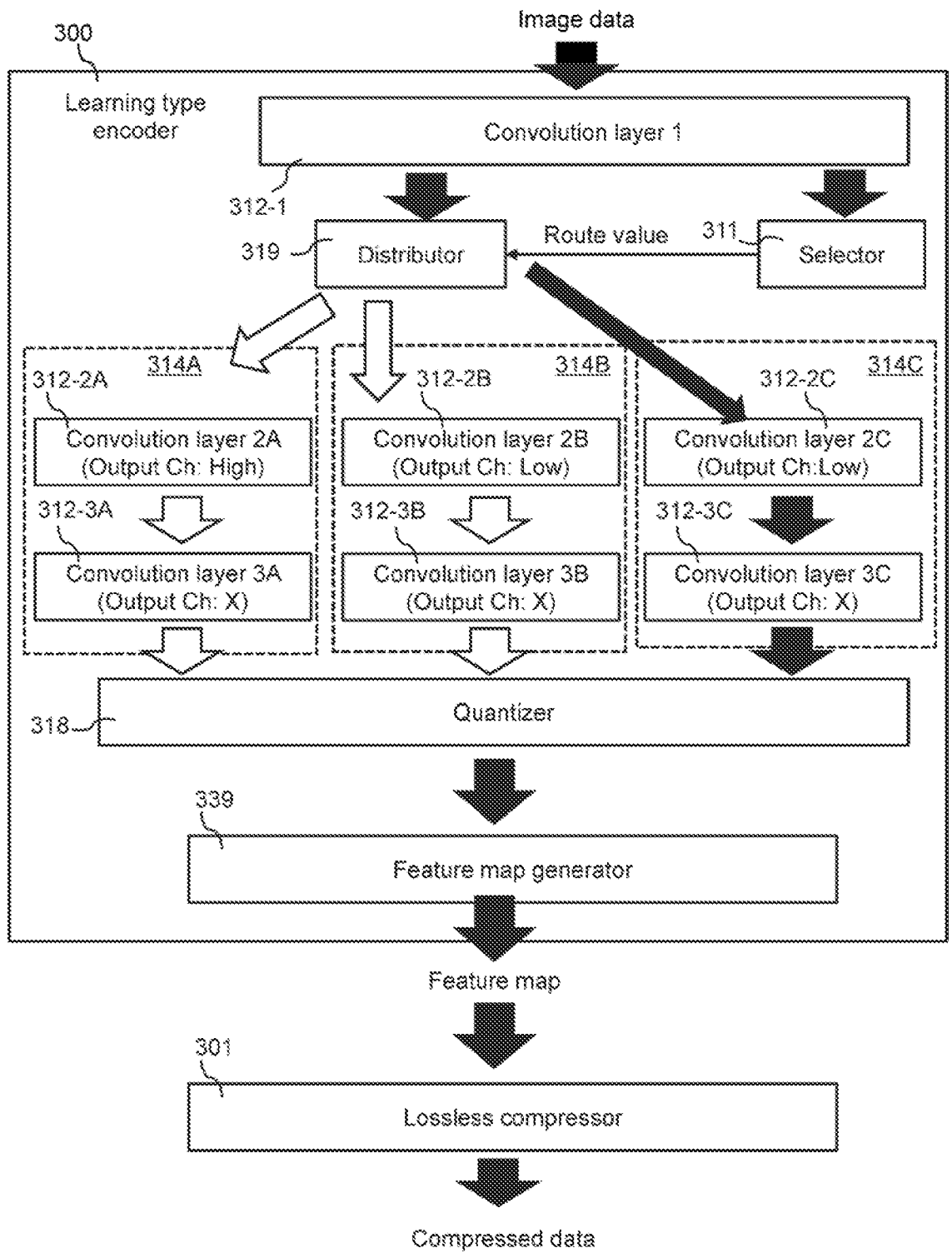
FIG. 3 is a diagram showing an encoder and a lossless compressor according to the first embodiment.

FIG. 3 shows an encoder 300 and a lossless compressor 301 of the storage node 100.

The encoder (learning type encoder) 300 includes a convolution layer 312-1, a plurality of compression routes 314 (three compression routes 314A to 314C in an example of FIG. 3), the selector 311, a distributor 319, and a quantizer 318.

Each of the plurality of compression routes 314A to 314C executes lossy compression. The plurality of compression routes 314A to 314C have the same amount of data loss but have different compression loads. The term "the amount of data loss" refers to an amount corresponding to an error between data before compression and data after decompression. The term "the same amount of data loss" may mean that the amounts of data loss are the same, or the amounts of data loss are different in an allowable range (a range in which the amounts of data loss can be considered to be substantially the same). For example, the term "the same amount of data loss" may specifically mean that an amount of data loss of the compression route 314E or 314C is the same as an amount of data loss of the compression route 314A with the highest compression load, or a difference therebetween is equal to or less than an allowable difference.

Each of the plurality of compression routes 314A to 314C is a convolutional neural network including a one-stage or multi-stage convolution layer 312 (convolution layers 312-2 and 312-3 in the example of FIG. 3).

According to FIG. 3, the encoder 300 is started when a still image has been transferred to the storage node 100 via the network 101. In the example of FIG. 3, data passes through three convolution layers 312-1, 312-2, and 312-3 regardless of which compression route 314 is passed through, but the invention is not limited to this example. For example, a route through a two-stage or four-stage convolution layer may exist among the plurality of compression routes 314. For example, if the compression routes 314 are different, the number of the convolution layer 312 through which the data passes may be different (in other words, the number of the convolution layer 312 may be different in the plurality of compression routes 314). In the example of FIG. 3, an activation function does not exist between the convolution layers to simplify the description. Alternatively, an activation function (for example, a Relu function or a Sigmoid function) may exist between the convolution layers. In the example of FIG. 3, the lossy compression is described as an example, but the invention is not limited to this example. For example, lossless compression may be used, or the compression may be configured such that an image is input to a convolution layer, an appearance probability for each pixel of the image is acquired as an output of the encoder, and the image is compressed by an entropy coder such as a Range-Coder by using the appearance probability.

Upon receiving the still image, the encoder 300 applies a convolution operation to three-dimensional (color, width, height) image data as still-image data in the first-stage convolution layer 312-1. At this time, an intermediate vector that is a result of the convolution operation is three-dimensional (output ch, width, height) data ("ch" means channel). In the present embodiment, according to the convolution operation in the first-stage convolution layer 312-1, the width and the height are smaller than those of the input image, and the number of the output ch is more than that of the input image. However, the convolution operation is not limited to this example in the invention. For example, the width and the height may be the same as those of the input image or may be increased. In addition, the number of the output ch may be a value of 2 or more. The intermediate vector is acquired for each of the plurality of partial images acquired from the still image.

In the present embodiment, a three-dimensional shape of the output data can be selected by the user via the client server 103.

In the present embodiment, the convolution operation in each of the convolution layers 312 is executed by the processor 112. The processor 112 may include at least one of a GPU, a FPGA, and an ASIC instead of or in addition to a CPU, and the convolution operation in each of the convolution layers 312 may be executed by the GPU, the FPGA, or the ASIC.

Figure 5:
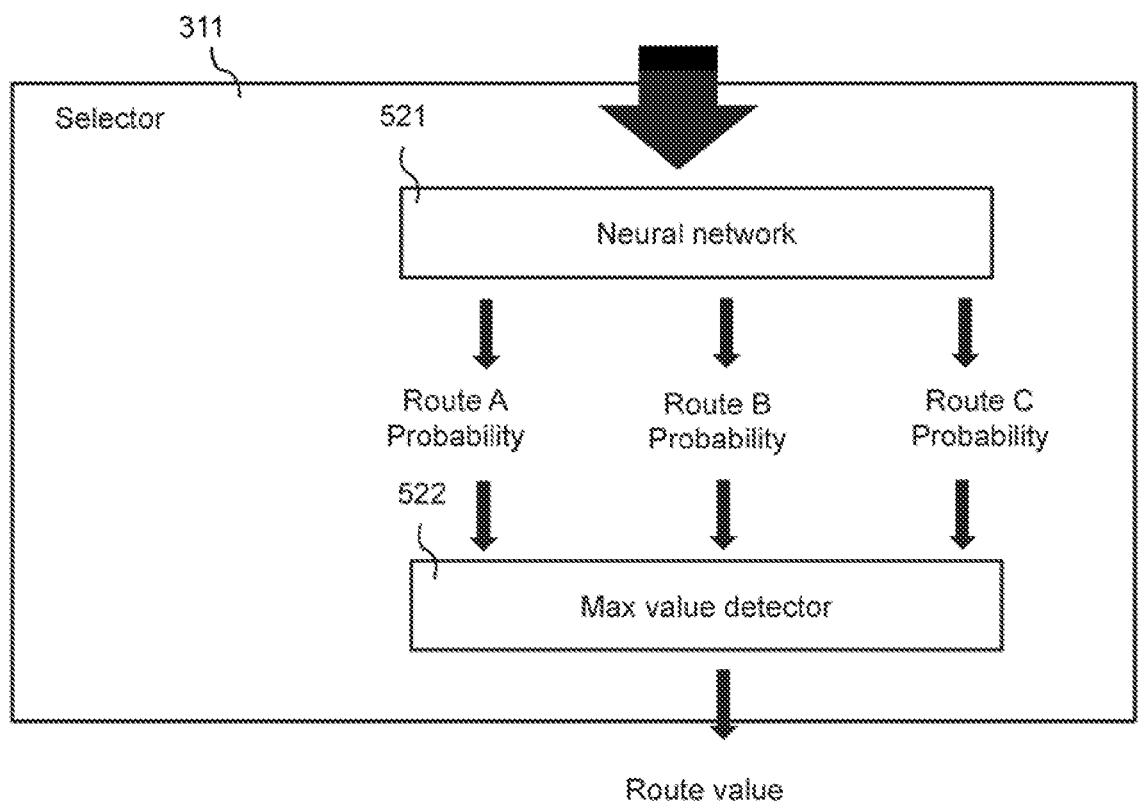
FIG. 5 is a diagram of a configuration of a selector according to the first embodiment.

The intermediate vector output from the convolution layer 312-1 is input to the selector 311. The selector 311 is shown in detail in FIG. 5. As shown in FIG. 5, the selector 311 includes a neural network 521 (for example, a fully coupled neural network or a convolutional neural network) and a max value detector 522 therein.

The three-dimensional intermediate vector input to the selector 311 is input to the neural network 521. The neural network 521 outputs a probability of each compression route 314 to select a compression route 314 suitable for compression of a partial image corresponding to the intermediate vector based on two-dimensional (width, height) data of ch0 in the intermediate vector. According to the example of FIG. 5, a probability is output for each of the three compression routes 314A to 314C shown in FIG. 3, but the number of the compression routes is not limited to three in the invention. At least two compression routes may be used. In the present embodiment, the compression route 314 is selected by the selector 311 using the output of the first-stage convolution layer 312-1, but the invention is not limited to this example. For example, the first-stage convolution layer 312-1 may be divided for each compression route 314, and the partial image may be directly input to the selector 311. The first-stage convolution layer 312-1 may be contained in the compression routes 314. In the present embodiment, the selector 311 selects the compression route 314 by using the two-dimensional data of ch0 in the intermediate vector, but the invention is not limited to this example. For example, three-dimensional data of two channels ch0 and ch1 in combination may be used for the selection of the compression route 314. In the present embodiment, the neural network 521 used to select the compression route 314 may be a convolutional neural network as described above. The neural network 521 may have learning ability for obtaining ability to select an appropriate compression route by learning processing described below.

The max value detector 522 detects the highest probability among a plurality of probabilities (a plurality of probabilities separately calculated for the plurality of compression routes 314) that are outputs of the neural network 521.

The max value detector 522 selects a compression route 314 corresponding to the detected probability and outputs a route value (for example, a scalar value) indicating the compression route 314.

As shown in FIG. 3, the output route value is input to the distributor 319. The partial image corresponding to the intermediate vector from which the route value is acquired is input to the distributor 319 from the convolution layer 312-1. The distributor 319 outputs the input partial image to the compression route 314 (that is, the compression route 314 selected by the selector 311) indicated by the route value input from the selector 311 among the plurality of compression routes 314A to 314C. According to a thick black arrow shown in FIG. 3, the compression route 314C is selected among the three compression routes 314A to 3110. The number of the output ch of a second-stage convolution layer 312-2C in the compression route 314C is smaller than that of a second-stage convolution layer 312-2A in the compression route 314A. This means that the selector 311 selects compression with a smaller load for the input partial image.

The number of the output ch of the second-stage convolution layer 312-2C in the compression route 314C is the same as that of a second-stage convolution layer 312-23 in the compression route 314B, and thus, compression loads of the second-stage convolution layer 312-2C and the second-stage convolution layer 312-2B are the same. However, for the compression of the input partial image, the selector 311 determines that the compression route 314C is more suitable than the compression route 314B. In the present embodiment, the selector 311 is configured to select the same compression route 314 for a group of similar partial images among the plurality of partial images. The term "group of similar partial images" may be, for example, one or more images whose probabilities calculated by the selector 311 are similar since features of partial images are similar. As a result, it is possible to construct an efficient compression route 314 (including one or more convolution layers 312) with a low compression load, which is specialized only in a specific partial image (for example, a partial image in which an area where the forest is reflected occupies most). Therefore, the load of the compression processing for a still image can be reduced as compared with that using an encoder (specifically, an encoder that has the ability to compress both monotonous and complex images with a small amount of data loss) according to the comparative example that includes a large-scale convolution layer having single general-purpose compression ability.

An intermediate vector output from a second-stage convolution layer 312-2 is input to a third-stage convolution layer 312-3 in the same compression route 314. The third-stage convolution layer 312-3 is a convolution layer in which the number of the output ch is X, and a convolution operation is executed so that a shape of the output is the same as a third-stage convolution layer 312-3 in another compression route 319. The invention is not limited to this example, and the number of the output ch may be different for third-stage convolution layers 312-3A to 312-3C in the compression routes 314A to 314C.

In the example in which the compression route 314C shown in FIG. 3 is selected, the number of the output ch of the second-stage convolution layer 312-2C in the compression route 314C is smaller than that of the compression route 314A. Thus, the load of the convolution operation in the second-stage convolution layer and the load of the convolution operation in the third-stage convolution layer in the compression route 314C are smaller than those of the compression route 314A. Therefore, the input partial image can be compressed at a higher speed than being processed in the compression route 314A. In the present embodiment, the selector 311 selects the compression route 314A for a complex partial image, and the processing same as the processing described using the compression route 314C as an example is executed. Therefore, a description of the operation of an example in which the compression route 314A is selected will be omitted.

An intermediate vector is generated and output based on the convolution operation executed by the third-stage convolution layer 312-3. The output intermediate vector is input to the quantizer 318. The quantizer 318 executes quantization of the input intermediate vector. Quantization here means that when each element of the intermediate vector has a floating point number or the like, each element is converted into an integer value or relatively few symbols. In the present embodiment, the quantizer 318 executes quantization of converting the intermediate vector into an integer value.

The output of the quantizer 318 is partial feature maps. The partial feature map includes an integer element, and has a format suitable for Huffman coding and arithmetic coding.

According to the example of FIG. 2, four partial images 201A to 201D are acquired from one still image 200, and the encoder 300 generates the partial feature map 211 for each of the four partial images 201A to 201D. The encoder 300 includes, for example, a feature map generator 339, and the feature map generator 339 may generate, by combining all the partial feature maps 211 in dimensions of width and height, i.e., three dimensions, the feature map 210 of the still image 200 to be compressed. In the present embodiment, four partial images 201 are acquired from the still image 200, but the invention is not limited to this example. For example, any number of data portions may be acquired from the data such as a still image.

After the partial feature map for each of all the partial images is generated and a feature map obtained by combining all the partial feature maps is generated, the lossless compressor 301 generates, at the end of the compression processing, compressed data by executing lossless compression by means of arithmetically coding the feature map. The invention is not limited to this example, and for example, compression by means of Huffman coding may be used. The invention is also applied to an example in which a context predictor of values of a feature map is constructed by a neural network separately from the neural network as a constituent element of the encoder 300, to enhance an effect of reducing the amount of data by means of the arithmetic coding based on the probability prediction (probability prediction for each element of the feature map) output by the context predictor.

The generated compressed data is stored into the persistent storage device 115 by, for example, storage related software.

(1-4) Decompression Processing

Next, the decompression processing executed by the storage node 100 according to the present embodiment will be described with reference to FIG. 4.

Figure 4:
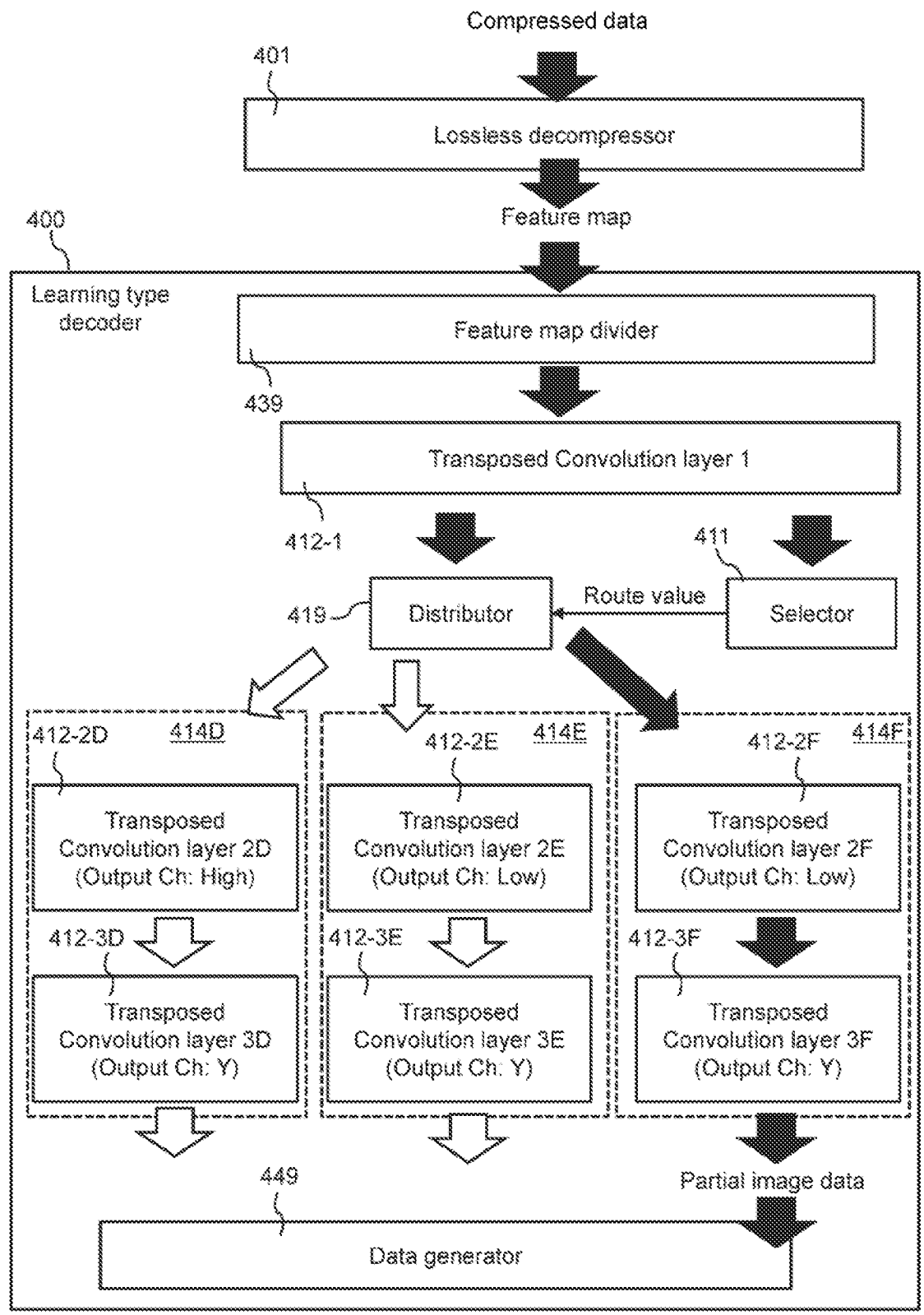
FIG. 4 is a diagram showing a decoder and a lossless decompressor according to the first embodiment.

FIG. 4 shows a decoder 400 and a lossless decompressor 401 of the storage node 100.

The decoder (learning type decoder) 400 includes a transposed convolution layer 412-1, a plurality of decompression routes 414, a selector 411, and a distributor 419.

In each of the plurality of decompression routes 414D to 414F, decompression is executed. The plurality of decompression routes 414D to 414F correspond to the plurality of compression routes 314A to 314C, respectively. For example, a partial image compressed in the compression route 314C may be decompressed in the decompression route 414F corresponding to the compression route 314C. The plurality of decompression routes 414D to 414F have different decompression loads.

Each of the plurality of decompression routes 414D to 414F includes a one-stage or multi-stage transposed convolution layer 412 (transposed convolution layers 412-2 and 412-3 in an example of FIG. 4).

According to the example shown in FIG. 4, the decompression processing is started when the storage node 100 is notified of an acquisition request of a still image from the client server 103.

Compressed data of the still image requested by the client server 103 is read from the persistent storage device 115 by, for example, storage related software. The read compressed data is input to the lossless decompressor 401. The lossless decompressor 401 acquires the feature map 210 by decompressing the compressed data. Then, the feature map 210 is divided, and a plurality of partial feature maps 211 are acquired. For example, the decoder 400 may include a feature map divider 439, and the feature map divider 439 may divide the feature map 210 to acquire the plurality of partial feature maps 211. In the example of FIG. 4, data passes through the three transposed convolution layers 412-1, 412-2, and 412-3 regardless of which decompression route 414 is passed through, but the invention is not limited to this example. For example, a route through a two-stage or four-stage transposed convolution layer may exist among the plurality of decompression routes 414. For example, if the decompression routes 414 are different, the number of the transposed convolution layer 412 through which the data passes may be different (in other words, the number of the transposed convolution layer 412 may be different in the plurality of decompression routes 414).

The decoder 400 restores the partial image from the partial feature map. In the transposed convolution layer 412-1, a transposed convolution operation is executed as first processing of the decoder 400. An intermediate vector that is a result of the transposed convolution operation is three-dimensional (output ch, width, height) data. In the present embodiment, the convolution operation is executed so that the width and the height are larger than those of the input feature map, but the invention is not limited to this example. For example, the width and height may be the same as those of the input image. In addition, the number of the output ch may be a value of 2 or more.

In the present embodiment, a three-dimensional shape of the output data can be selected by the user via the client server 103.

In the present embodiment, the transposed convolution operation in each of the transposed convolution layers 412 is executed by the processor 112. Alternatively, the processor 112 may include at least one of a GPU, a FPGA, and an ASIC instead of or in addition to a CPU, and the transposed convolution operation in each of the transposed convolution layers 412 may be executed by the GPU, the FPGA, or the ASIC.

The intermediate vector output from the transposed convolution layer 412-1 is input to the selector 411. The selector 411 has the same structure as that of the selector 311 shown in FIG. 5 described above, so that detailed descriptions thereof will be omitted.

Two-dimensional (width, height) data of ch0 in the three-dimensional intermediate vector input to the selector 411 is input to a neural network in the selector 411. The neural network outputs a probability of each decompression route to select a decompression route suitable for decompression of a partial image corresponding to the intermediate vector based on the two-dimensional (width, height) data of ch0 in the intermediate vector. Amax value detector detects the highest probability among the plurality of probabilities output from the neural network, selects a decompression route 414 corresponding to the probability, and outputs a route value (for example, a scalar value) that is a value indicating the decompression route 414. FIG. 5 shows an example in which there are three routes, and shows an example in which a probability of each of the three routes is output, but the invention is not limited to three routes. There may be two or more routes. In the present embodiment, the decompression route is selected by the selector 411 using the output of the first-stage transposed convolution layer 412-1, but the invention is not limited to this example. For example, the first-stage transposed convolution layer 412-1 may be divided for each decompression route 414, and the partial feature map may be directly input to the selector 411 to select the decompression route 414. In the decompression processing described above, a decompression route in the decompression processing may be determined in advance, and information of the decompression route may be stored in the feature map. In this case, the decompression route is selected based on the route information included in the feature map.

The route value is input to the distributor 419 from the selector 411. The partial feature map corresponding to the intermediate vector from which the route value is acquired is input to the distributor 419 from the transposed convolution layer 412-1. The distributor 419 outputs the input partial feature map to the decompression route 414 indicated by the route value input from the selector 411 among the plurality of decompression routes 414D to 414F. According to a thick black arrow shown in FIG. 4, the decompression route 414F is selected among the three decompression routes 414D to 414F. The number of the output ch of a second-stage transposed convolution layer 412-2F in the decompression route 414F is smaller than that of a second-stage transposed convolution layer 412-2D in the decompression route 414D. This means that the selector 411 selects a decompression route 414F with a smaller load for the input partial feature map.

The number of the output ch of the second-stage transposed convolution layer 412-2F in the decompression route 414F is the same as that of a second-stage transposed convolution layer 412-2E in the decompression route 414E, and thus, decompression loads of the second-stage transposed convolution layer 412-2F and the second-stage transposed convolution layer 412-2E are the same. However, for the decompression of the input partial feature map, the selector 411 determines that the decompression route 414F is more suitable than the decompression route 414E. In the present embodiment, the selector 411 is configured such that the same decompression route 414 is selected for a group of similar partial feature maps among the plurality of partial feature maps (for example, one or more partial feature maps having similar features). As a result, it is possible to construct an efficient decompression route 414 with a low decompression load, which is specialized only in a specific partial feature map. Therefore, the load of the decompression processing for the compressed data can be reduced as compared with that using a decoder according to the comparative example that includes a large-scale transposed convolution layer having single general-purpose decompression ability.

An intermediate vector output from a second-stage transposed convolution layer 412-2 is input to a third-stage transposed convolution layer 412-3 in the same decompression route 414. The third-stage transposed convolution layer 412-3 is a layer in which a transposed convolution operation is executed, in which the number of the output ch (for example, for a color image, Y=3) is the same as that of the original still image.

In the example in which the decompression route 414F shown in FIG. 4 is selected, the number of the output ch of the second-stage transposed convolution layer 412-2F in the decompression route 414F is smaller than that of the decompression route 414D. Thus, a load of the transposed convolution operation in the second-stage transposed convolution layer and a load of the transposed convolution operation in the third-stage transposed convolution layer in the decompression route 414F is smaller than those of the decompression route 414D. Therefore, the input partial feature map can be decompressed at a higher speed than being processed in the decompression route 414D. In the present embodiment, the selector 411 selects the decompression route 414D for a complex partial feature map, and the processing same as the processing described using the decompression route 414F as an example is executed. Therefore, a description of operation of an example in which the decompression route 414D is selected will be omitted.

After all partial images that are outputs of the third-stage transposed convolution layer 412-3 are acquired, all the partial images are combined to generate the still image requested by the client server 103. For example, the decoder 400 includes a data generator 449, and the data generator 449 may generate the still image from the plurality of partial images. For example, the storage related software may transfer the still image to the client server 103. As a result, the still image requested by the user can be acquired.

(1-5) Overview of Learning Processing of Encoder and Decoder

Heretofore, the compression processing and the decompression processing have been described. The encoder 300 and the decoder 400 respectively executing the compression processing and the decompression processing each include a neural network and optimize values related to the compression processing and the decompression processing by learning processing. Therefore, it is possible to execute optimal compression processing and optimal decompression processing. Specifically, for example, the kernel amount (for example, at least one of the number of kernels and the kernel size) in the convolution operation of the encoder 300 and the transposed convolution operation of the decoder 400 is determined by the learning processing. Parameters of the neural network of the selector 311 in the encoder 300, and parameters of the neural network of the selector 411 in the decoder 400 are also determined by the learning processing.

Next, an overview of the learning processing including learning for respective parameters of such a neural network is described with reference to FIG. 6.

In the compression processing and the decompression processing described heretofore, the input data (the partial image and the partial feature map) passes through only one route, selected by the selectors 311 and 411, among the plurality of routes in the encoder 300 and the decoder 400. In the learning processing, all the route combinations in the encoder 300 and the decoder 400 are used. One route combination is a combination of one compression route 314 and one decompression route 414.

Figure 6:
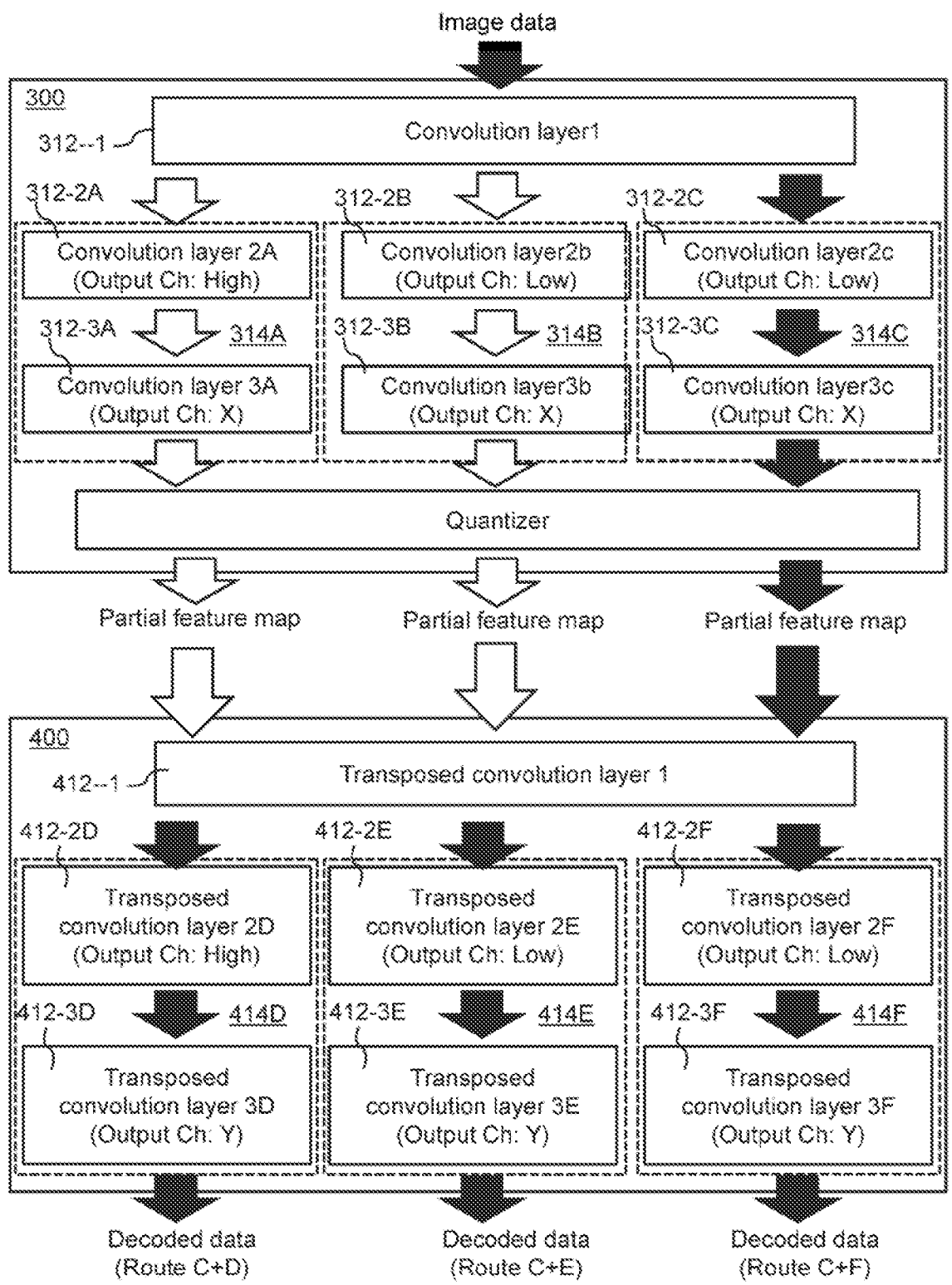
FIG. 6 is a schematic diagram of learning processing according to the first embodiment.

In an example of FIG. 6, the encoder 300 has three routes and the decoder 400 has three routes, so that there are nine combinations of the compression route 314 of the encoder 300 and the decompression route 914 of the decoder 400. Therefore, nine types of decoded partial images are generated for each partial image.

Thick black arrows shown in FIG. 6 show the following example. That is, a partial image passes through the compression route 314C in the encoder 300 to generate a partial feature map. The generated partial feature map passes through all the decompression routes 414D to 414F in the decoder 400 separately to acquire three decoded partial images. That is, three route combinations (a combination of routes 3140 and 414D, a combination of routes 314C and 414E, and a combination of routes 314C and 414F) are used in this example.

The partial image is also input to each of the compression routes 314A and 314B in addition to the compression route 314C, and thus, three decoded partial images output from the three decompression routes 419D to 414F are acquired for each of the compression routes 314A and 314B. That is, for one partial image, the number of decoded partial images same as a product of the number of compression routes 314 and the number of decompression routes 414 are acquired. Parameters (for example, weight, total coupling coefficient, and kernel amount) of the neural network of the encoder 300 and the decoder 400 are determined by learning processing of reducing an error between a decoded partial image in all of the route combinations and the original partial image.

Figure 11:
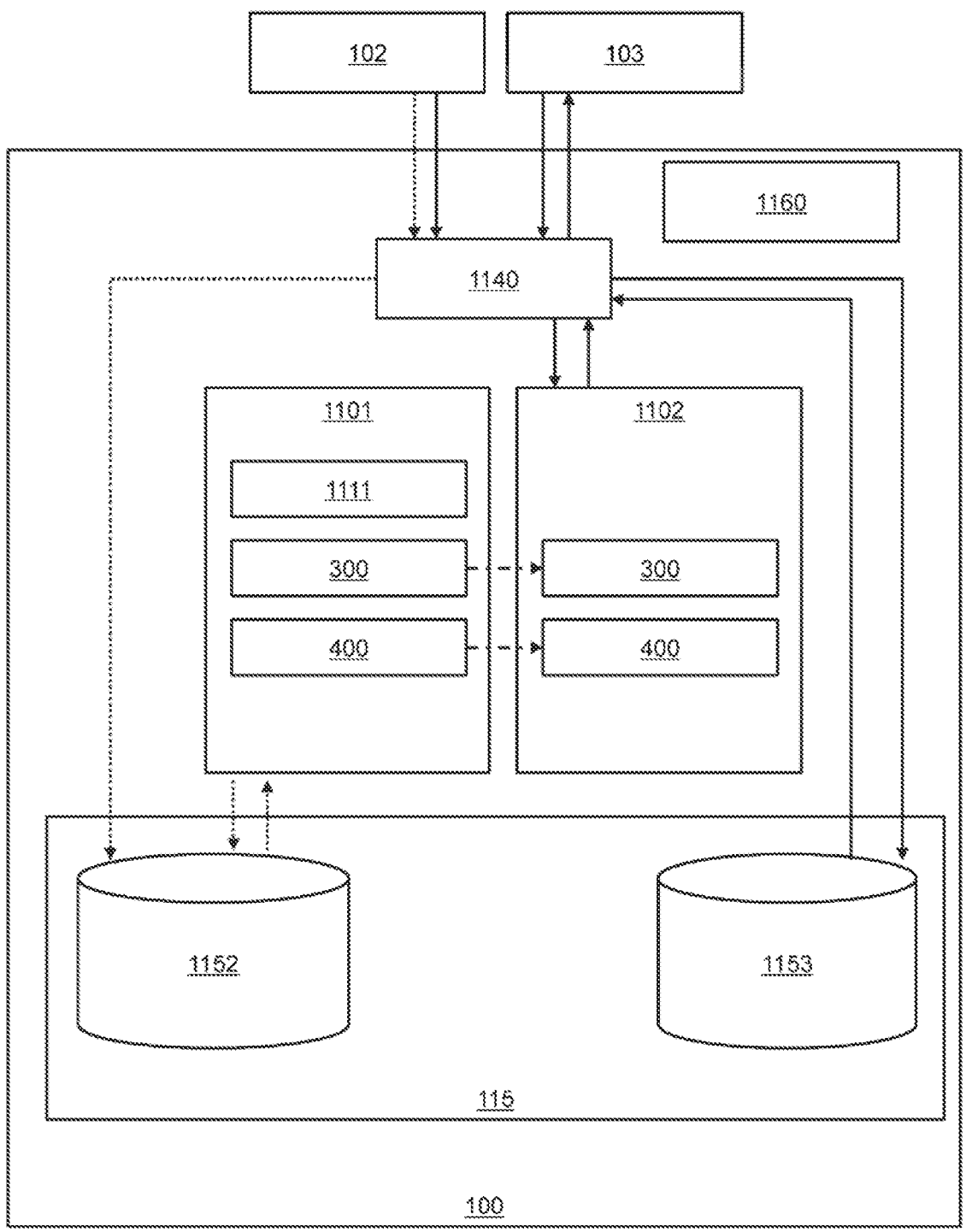
FIG. 11 is a schematic diagram of learning and reasoning according to the first embodiment.

Learning and reasoning that uses results of the learning are, for example, as shown in FIG. 11. In FIG. 11, dashed arrows indicate a data flow in the learning, and solid arrows indicate a data flow in the reasoning.

That is, the storage node 100 includes a learning module 1101, a reasoning module 1102, a setting module 1160, a learning storage area 1152, and a reasoning storage area 1153. Each of the learning storage area 1152 and the reasoning storage area 1153 may be a logical storage area (for example, volume) based on the persistent storage device 115.

The learning module 1101 includes a learning controller 1111, and the encoder 300 and the decoder 400 to be learned. A storage controller 1140 receives a teacher still image (a still image for learning) from the data source 102 and stores the teacher still image into the learning storage area 1152 (typically, a plurality of teacher still images are received from one or more data sources 102 and stored into the learning storage area 1152). The learning controller 1111 reads the teacher still image from the learning storage area 1152. For each partial image based on the read teacher still image, the learning controller 1111 inputs the partial image to each of the compression routes 314A to 314C of the encoder 300 to acquire three types of partial feature maps, or inputs each partial feature map to each of the decompression routes 414D to 414F of the decoder 400 to acquire nine types of decoded partial images. For each of a plurality of original partial images of the teacher still image, the learning controller 1111 executes learning of the encoder 300 and the decoder 400 based on the original partial image and the nine types of decoded partial images of the original partial image.

The encoder 300 and the decoder 400 in the reasoning module 1102 are the encoder 300 and the decoder 400 after learning. For example, the storage controller 1140 inputs a still image from the data source 102 to the encoder 300 to acquire compressed data, and stores the acquired compressed data into the reasoning storage area 1153. For example, for example, in response to a request from the client server 103, the storage controller 1140 reads the compressed data from the reasoning storage area 1153 and inputs the read compressed data to the decoder 400 to acquire a decoded still image, and transfers the acquired still image to the client server 103.

Details of the learning processing will be described below (the setting module 1160 will be described below with reference to FIG. 8).

(1-6) Flow of Learning Processing of Encoder and Decoder

Figure 7:
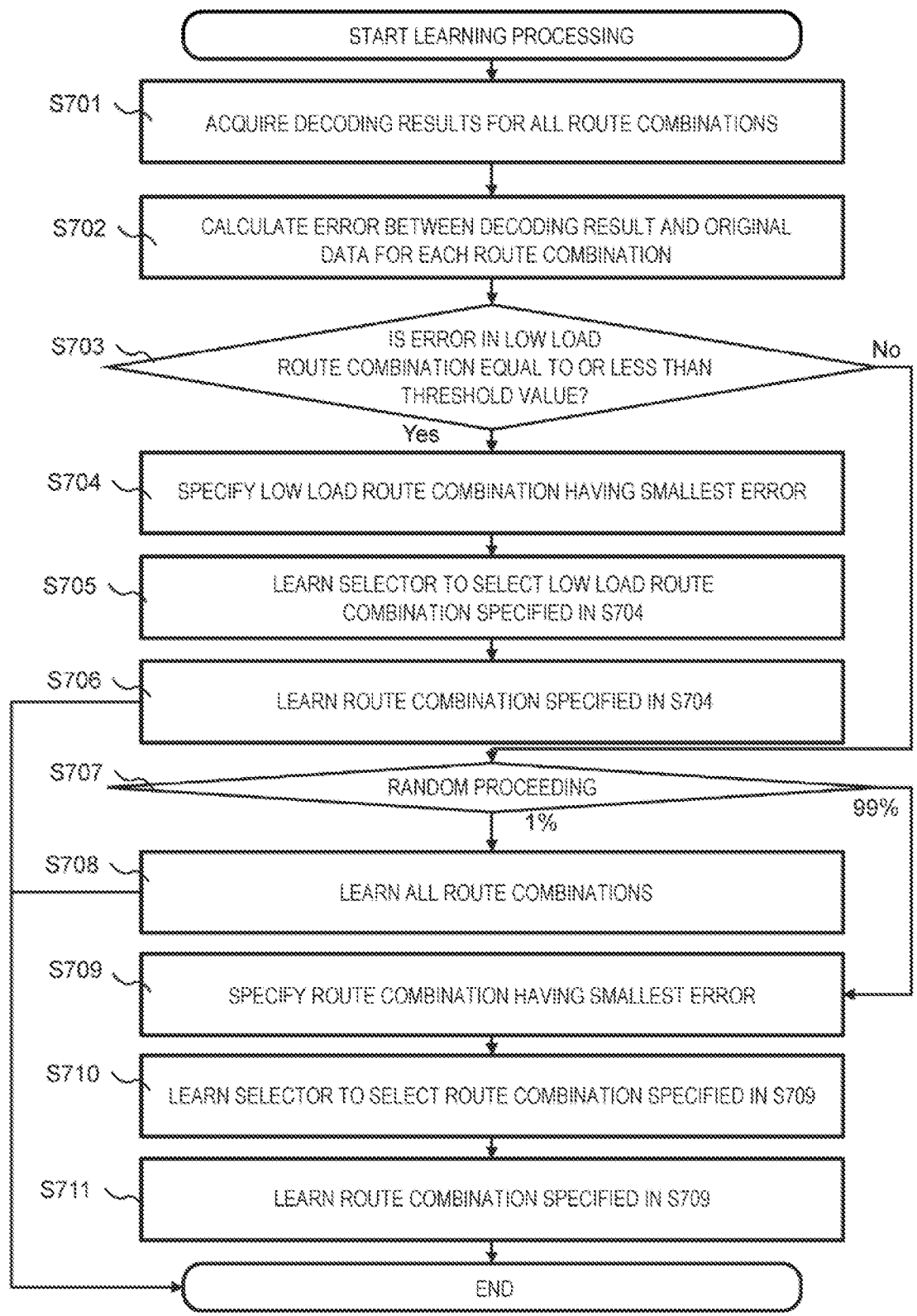
FIG. 7 is a flow chart of the learning processing according to the first embodiment.

Next, the learning processing of the encoder 300 and the decoder 400 will be described with reference to FIG. 7. FIG. 7 is a flowchart of the learning processing of the encoder 300 and the decoder 400 according to the present embodiment. The invention is not limited to this example, and the selectors 311 and 411 in the encoder 300 and the decoder 400 described above may be appropriately learned. A large number of still images (and a large number of partial images generated therefrom) are used for the learning processing, and an image to be compressed is not necessarily to be included in the images used for the learning processing. Each step shown in FIG. 7 may be performed by, for example, the learning controller 1111.

During learning a large number of still images, the encoder 300 acquires the ability to recognize features of a partial image that can be compressed with a small load. When a partial image to be compressed, similar to the partial image, is input, the encoder 300 acquires the ability to select a compression route 314 with a small load if the compression route 314 with a small load is determined to be used. The convolution layer 312 belonging to a certain compression route 314 in the encoder 300 acquires the ability of the compression processing specialized only in a group of similar partial images assigned to the compression route 314 by the selector 311.

Similarly, the decoder 400 also acquires, by the learning processing, the ability to recognize features of a partial feature map that can be decompressed with a small load. When a partial feature map to be decompressed, similar to the partial feature map, is input, the decoder 400 acquires the ability to select the same decompression route 414. The transposed convolution layer 412 belonging to a certain decompression route 414 in the decoder 400 acquires the ability of the decompression processing specialized only in a group of similar partial feature maps assigned to the decompression route 414 by the selector 411.

The flow of the learning processing shown in FIG. 7 is a flow for one partial image. For each teacher still image (still image for learning), the flow shown in FIG. 7 is executed for each of the plurality of partial images based on the still image. Hereinafter, one partial image is taken as an example. In the following description, for simplicity of the description, a route combination of a compression route 314a ($\alpha$=A, B or C in the example of FIG. 6) and a decompression route 414β (β=D, E or F in the example of FIG. 6) is denoted as "α|β".

S701, which is a first step, is a step of generating all types of decoded partial images, which are all types of decoding results, through all route combinations for the partial image.

Step S702 subsequent to step S701 is a step of calculating an error, which is a difference between the decoded partial image and the original partial image, for each decoded partial image generated in step S701. That is, an error is calculated for each route combination. In the present embodiment, the error is calculated as a mean squared error (MSE), which is a mean square of a difference between values of each pixel of the images. The invention is not limited to MSE as the error, and any error may be used as long as it indicates a degree of similarity between the decoding result and the original data, such as multi-scale structural similarity index measure (SSIM). In addition, for each route combination, the error calculated in S702 may be a value obtained by adding an information entropy of a partial feature map output through the compression route 314 in the route combination to the error between the decoded partial image and the original partial image. As a result, the compression route 314 of the encoder 300 can learn not only to reduce the error but also to perform conversion so that the amount of data reduction due to lossless compression in the lossless compressor 301 increases.

Step S703 subsequent to step S702 is a step of determining whether there is a route combination, in which an error is equal to or less than a threshold value, in a low load route combination (which is B+E, B+F, C+E, and C+F in the example of FIG. 6) among all the route combinations. The term "low load route combination" refers to a route combination in which the processing load is relatively low, and refers to, for example, a route combination in which both the number of the output ch of the compression route 314 and the number of the output ch of the decompression route 414 are denoted as "Low". When there is a low load route combination in which the error is equal to or less than the threshold value, the processing proceeds to S704 since it can be determined that both the encoder 300 and the decoder 400 can execute calculations with a small load. In contrast, when there is no low load route combination in which the error is equal to or less than the threshold value, the processing proceeds to S707 since it can be determined that processing with a high load is required to be executed by either or both of the encoder 300 and the decoder 400.

Step S704 proceeding from step S703 is a step of specifying a route combination having smallest the error among the low load processing routes.

Step S705 subsequent to step S704 is a step of executing learning for the neural network in the selector 311 of the encoder 300 and in the selector 411 of the decoder 400 to select the low load processing route specified in S704. More specifically, for example, when the learning is executed to select the compression route 314C, the parameters of the neural network 521 are updated such that a probability of the compression route 314C is "1" and a probability of each of the compression routes 314A and 3143 is "0" in outputs of the neural network 521 in the selector 311.

Step S706 subsequent to step S705 is a step of executing learning of the route combination specified in S704. More specifically, for example, when the route combination specified in S704 is C+F, only the convolution layers 312-2C and 312-3C, belonging to the compression route 314C, and the first-stage convolution layer 312-1 are learned for the encoder 300, and only the transposed convolution layers 912-2F and 412-3F, belonging to the decompression route 419F, and the first-stage transposed convolution layer 412-1 are learned for the decoder 400. Based on this processing, the learning for one time for the partial image ends. The learning in step S706 may be based on an error between the original partial image and the decoded partial image corresponding to the route combination C+F. For example, when an error between the original partial image and another partial image is greater than the error between the original partial image and the partial image corresponding to the route combination C+F, the learning may include adjusting parameters of the convolution layer 312 or the transposed convolution layer 412 to further reduce the error.

Step S707 proceeding from step S703 is a randomly proceeding step. In an example shown in FIG. 7, the processing proceeds to step S708 with a probability of 1%, and the processing proceeds to step S709 with the remaining probability of 99%. The invention is not limited to the combination of proceeding probabilities. For example, in general, if the probability of proceeding to S708 is sufficiently smaller than the probability of proceeding to S709, the learning is completed. Step S707 is a step provided to prevent the compression route 314, in which the partial image is compressed, from being fixed early, and the processing may proceed to S709 with a probability of 100% when allocation of the partial image to each compression route is stabilized.

Step S708 proceeding from step S707 is a step of learning all route combinations. In a transitional state of the learning, a suitable route combination may appear by the learning as compared with the route combination having the smallest error at a current time point. In order to search for such a route combination, all the route combinations can be learned equally. Based on this processing, the learning for one time for the partial image ends.

Step S709 proceeding from step S707 is a step of specifying a route combination having the smallest error by searching for an optimal processing route from a plurality of route combinations including route combinations other than the low load route combination since the error is not sufficiently reduced by the low load route combination in S703.

Step S710 subsequent to step S709 is a step of executing learning for the neural network in the selector 311 of the encoder 300 and in the selector 411 of the decoder 400 to select the route combination specified in S709. The content of the more specific learning is substantially the same as the content described in step S705, so that a description thereof will be omitted.

Step S711 subsequent to step S710 is a step of learning only the route combination specified in S709. Details of the learning are the same as the details described in S706, and a description thereof will be omitted. Based on this processing, the learning for one time for the partial image ends.

When the flow in FIG. 7 described heretofore is repeated for each partial image for a sufficient number of times, the learning of the neural network in the encoder 300 and the decoder 400 is completed.

The above is the flow of the learning processing in the present embodiment. The decoder 400 includes a plurality of decompression routes 414 in the present embodiment. Alternatively, one decompression route 414 may be provided. In this case, three types of decoded partial images, which correspond to the compression routes 314A to 314C, are acquired for the same partial image.

(1-7) User Interface

Next, a user interface in the present embodiment will be described with reference to FIG. 8. FIG. 8 shows an example of a management screen as an example of a user interface provided by the storage node 100 to the client server 103 via the network 101. In the present embodiment, the user can set the compression by using the client server 103.

A management screen 800 (for example, a graphical user interface (GUI)) shown in FIG. 8 is provided by the setting module 1160. The management screen 800 is a screen for receiving specification of attribute values of at least one of the encoder 300 and the decoder 400. The management screen 800 includes six input fields 801 to 806 related to setting of the encoder 300, and five input fields 811 to 815 related to setting of the decoder 400. Each input field is an example of the UI.

With respect to the encoder 300, the input fields are as follows. The input field 801 is an input field for receiving specification of the number of the output ch in a top convolution layer (for example, the convolution layer 312-1). Each of the input fields 802 and 803 is an input field for receiving specification of the number of compression routes 314 corresponding to a grade (for example, "High" or "Low") of the number of the output ch in an intermediate convolution layer (for example, the convolution layer 312-2) in which the number of the output ch is variable (the number of compression routes 314 including the convolution layer 312 at the grade). Each of the input fields 804 and 805 is an input field for receiving specification of the number of the output ch corresponding to the grade of the number of the output ch. The input field 806 is an input field for receiving specification of the number of the output ch in a tail convolution layer (for example, the convolution layer 312-3).

With respect to the decoder 400, the input fields are as follows. The input field 811 is an input field for receiving specification of the number of the output ch in a top transposed convolution layer (for example, the transposed convolution layer 412-1). Each of the input fields 812 and 813 is an input field for receiving specification of the number of decompression routes 414 corresponding to a grade of the number of the output ch in an intermediate transposed convolution layer (for example, the transposed convolution layer 412-2) in which the number of the output ch is variable (the number of decompression routes 414 including the transposed convolution layer 412 at the grade). Each of the input fields 814 and 815 is an input field for receiving specification of the number of the output ch corresponding to the grade of the number of the output ch.

According to the input fields 802, 803, 812, and 813, the number of routes can be increased or decreased for each grade of the number of the output ch. As a result, it is possible to perform compression and decompression specialized in certain data for each route, and thus both improvements in compression ratios and reduction of data loss due to compression are expected.

According to the input fields 804, 805, 814, and 815, an appropriate processing load can be set.

The encoder 300 and the decoder 400 having the configuration according to values input through the management screen 800 are constructed by the setting module 1160. For example, when "3" is input to the input field 803, the encoder 300 including three low load compression routes is constructed. The low load compression route mentioned here is a compression route in which the number of the output ch of the convolution layer 312-2 is denoted as "Low".

The invention is not limited to the management screen 800. For example, the number of the output ch of the convolution operation in the second-stage convolution layer is not divided into two stages of "High" and "Low", and may be divided into more stages.

The above is the management screen 800 in the present embodiment.

Second Embodiment

Next, a second embodiment will be described. In this case, the differences from the first embodiment will be mainly described, and the points common with the first embodiment will be omitted or simplified.

In the first embodiment, the plurality of compression routes 314 (the plurality of decompression routes 414) and the selector 311 (the selector 411) for selecting a compression route 314 (a decompression route 414) in the encoder 300 (or the decoder 400) are included. An optimal compression route (partial feature map) is selected for each partial image (partial feature map) to be a target, and compression (or decompression) is performed.

In contrast, in the second embodiment, the processing load can be reduced (in other words, the processing speed can be increased) by setting the number of channels in the convolution operation (transposed convolution operation), the kernel amount in the convolution operation, or the like to an optimal value for each partial image and each partial feature map, instead of preparing a plurality of compression routes (a plurality of decompression routes).

A system configuration according to the second embodiment is the same as that of the first embodiment, and a description thereof will be omitted.

An encoder 900 according to the second embodiment will be described with reference to FIG. 9.

The encoder 900 includes convolution layers 912-1 and 912-2, a separator 920, and a neural network (for example, a fully coupled neural network) 910.

First processing of the encoder 900 is processing for a first-stage convolution layer 912-1, and the same processing as that of the first embodiment may be performed. In the present embodiment, the number of the ch in three-dimensional (ch, width, height) intermediate vectors output from the first-stage convolution layer 912-1 is described as six, but the number of the ch in the invention is not limited to six.

Next, the intermediate vectors, which are processing results of the first-stage convolution layer 912-1, are input to the separator 920. The separator 920 divides the three-dimensional (ch, width, height) intermediate vectors into two groups of ch0 and ch1 to ch5.

The ch0 in the intermediate vectors divided by the separator 920 is input to the neural network 910. The neural network 910 has outputs in the same number as the number of channels in the intermediate vectors separated by the separator 920. In an example of FIG. 9, there are five channels ch1 to ch5, so that there are five outputs. Each of the five outputs corresponds to a probability (a value of 0 or more and 1 or less) of using a channel corresponding to the output.

In the present embodiment, a ch corresponding to an output with a probability of 0.5 or less is not used for calculation in the convolution operation in the second-stage convolution layer. In contrast, a ch corresponding to an output with a probability of more than 0.5 and 1.0 or less is processed by the convolution operation in the second-stage convolution layer. In this way, only the required minimum channel needs to be calculated according to the complexity of the partial image, and the processing load can be reduced.

The neural network 910 also outputs the kernel amount to be used for the next convolution operation. The neural network 910 increases or decreases the required kernel amount (at least one of the number of kernels and the kernel size) according to the complexity of the partial image, and is controlled to reduce the kernel amount in the case of a simple partial image. The present embodiment describes control of changing the kernel amount in the next convolution operation or the number of channels, which is input, in accordance with the input partial image, but the invention is not limited to this example. For example, various parameters depending on the calculation may be output, such as a calculation amount in the convolution operation, including the number of strides and the number of paddings in the convolution operation, and a calculation thinning-out method.

In the present embodiment, the neural network 910 inputs the intermediate vectors that are results of the convolution operation in the first-stage convolution layer, but the present invention is not limited to this example. For example, a partial image that is an input to the encoder 900 may be input, and the kernel amount, the number of stripes, and the like in the convolution operation in the first-stage convolution layer may be controlled. The number of stages of the convolution layer 912 is preferably not limited. The neural network 910 for outputting and specifying the kernel amount and the probability of each ch may exist for each predetermined convolutional layer 912.

The neural network 910 may be, for example, a neural network based on the convolution operation. Any processing method, which can calculate parameters related to a calculation amount in the convolution operation, such as an appropriate channel and a kernel amount by learning, and has learning ability, may be used.

The neural network 910 receives two-dimensional (width, height) data of ch0 in the intermediate vectors divided by the separator 920 as inputs, and outputs a probability of each of channels ch1 to ch5 and the kernel amount. ch1 to ch5 are input channels of the convolution layer 921-2.

In the second-stage convolution layer 912-2, which receives the ch and the kernel amount from the neural network 910, the convolution operation is executed within a range of the specified kernel amount and a partial feature map of the partial image is generated by using only the ch (ch with a probability more than 0.5) used for the calculation among ch1 to ch5. With this method, for a simple partial image, it is possible to calculate lightly with few channels and a small kernel amount, and to achieve a high speed.

A feature map including the generated partial feature map is generated in the same manner as in the first embodiment, and is input to the lossless compressor 301 to generate compressed data of the still image.

The above is the processing in the encoder 900 according to the second embodiment. The selection of the calculation ch implemented by the neural network 910 in the encoder 900 is similarly applicable to selection of a ch used for the transposed convolution operation in a transposed convolution layer in the decoder, so that the description of the decoder according to the second embodiment is omitted.

Figure 10:
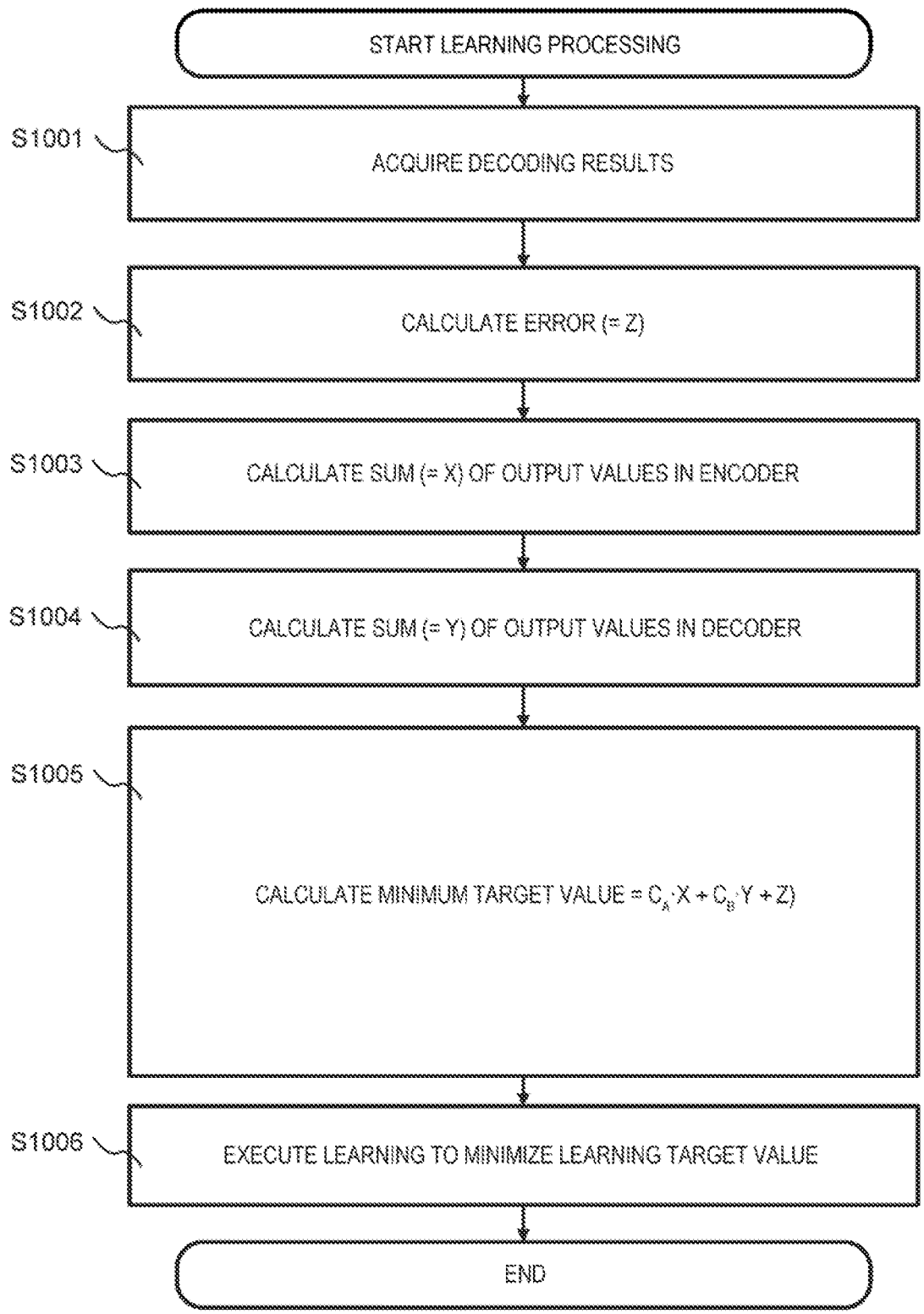
FIG. 10 is a flow chart of learning processing according to the second embodiment.

Next, a flow of learning processing of the encoder and the decoder according to the second embodiment will be described with reference to FIG. 10. The flow of FIG. 10 is performed for each partial image. One partial image is taken as an example. Each step in FIG. 10 may be performed by, for example, a learning module (for example, a learning controller).

A decoded partial image is acquired in step S1001. Specifically, a partial image is converted into a partial feature map by the encoder, and the partial feature map is converted into a decoded partial image by the decoder.

In the subsequent step S1002, Z (an error between the input partial image and the decoded partial image (in other words, the amount of data loss)) is calculated.

In the subsequent step S1003, X (a sum of output values of the neural network 910 in the encoder 900) is calculated. As described above, with regard to outputs regarding the ch of the neural network 910, a value of 0 to 1 is output for each ch in the intermediate vectors, and in addition, the kernel amount is output. The higher the total value of these output values, the larger the number of channels used for the calculation and the larger the kernel amount. In the present embodiment, the learning is executed to reduce the total value and the error determined in S1002 at the same time, so that trade-offs between the data loss due to the compression and the calculation amount can be achieved. In the present embodiment, the learning is executed to reduce the output values of the neural network 910, but the invention is not limited to this example. For example, a calculation amount in the convolution operation, which is estimated based on the kernel amount and the number of channels, is calculated, and the learning may be executed to reduce the calculation amount.

In the subsequent step S1004, Y (a sum of output values of the neural network in the decoder) is calculated.

A minimization target value (=$C_A \times X + C_B \times Y + Z$) is calculated in the subsequent step S1005. Each of the $C_A$ and $C_B$ is a coefficient.

Output is performed by using the minimization target value such that the number of channels in the encoder and the decoder required to minimize Z is minimized. When the performance is to be improved at the expense of an image quality, the value of the $C_A$ and the $C_H$ of the minimization target value is increased, and thereby the learning to reduce the number of channels used for the calculation progresses. In contrast, the $C_A$ and the $C_B$ of the minimization target value is reduced, and thereby the learning using more channels progresses.

When learning with a large $C_A$, compression performance is prioritized for the same quality, and when learning with a large $C_B$, decompression performance is prioritized for the same quality.

In the subsequent step S1006, the learning is executed to reduce the learning target value calculated in S1005.

The above is the flow of the learning processing according to the second embodiment. In the learning processing according to the second embodiment, learning, which minimizes a minimization target value (=$C_K \times P + C_L \times (-Q) + R$) instead of or in addition to the minimum target value described above, may be executed for the neural network 910. R represents an error between the input partial image and the decoded partial image (in other words, the amount of data loss). P represents the kernel amount. Q represents the number of channels to be masked. Each of the $C_K$ and $C_L$ represents a coefficient. The smaller the number of channels to be masked, the greater the calculation load. The larger the kernel amount, the greater the calculation load.

For example, the following can be summarized based on the descriptions of the first embodiment and the second embodiment. The following summary may include any supplementary or modifications of the above descriptions.

Figure 12:
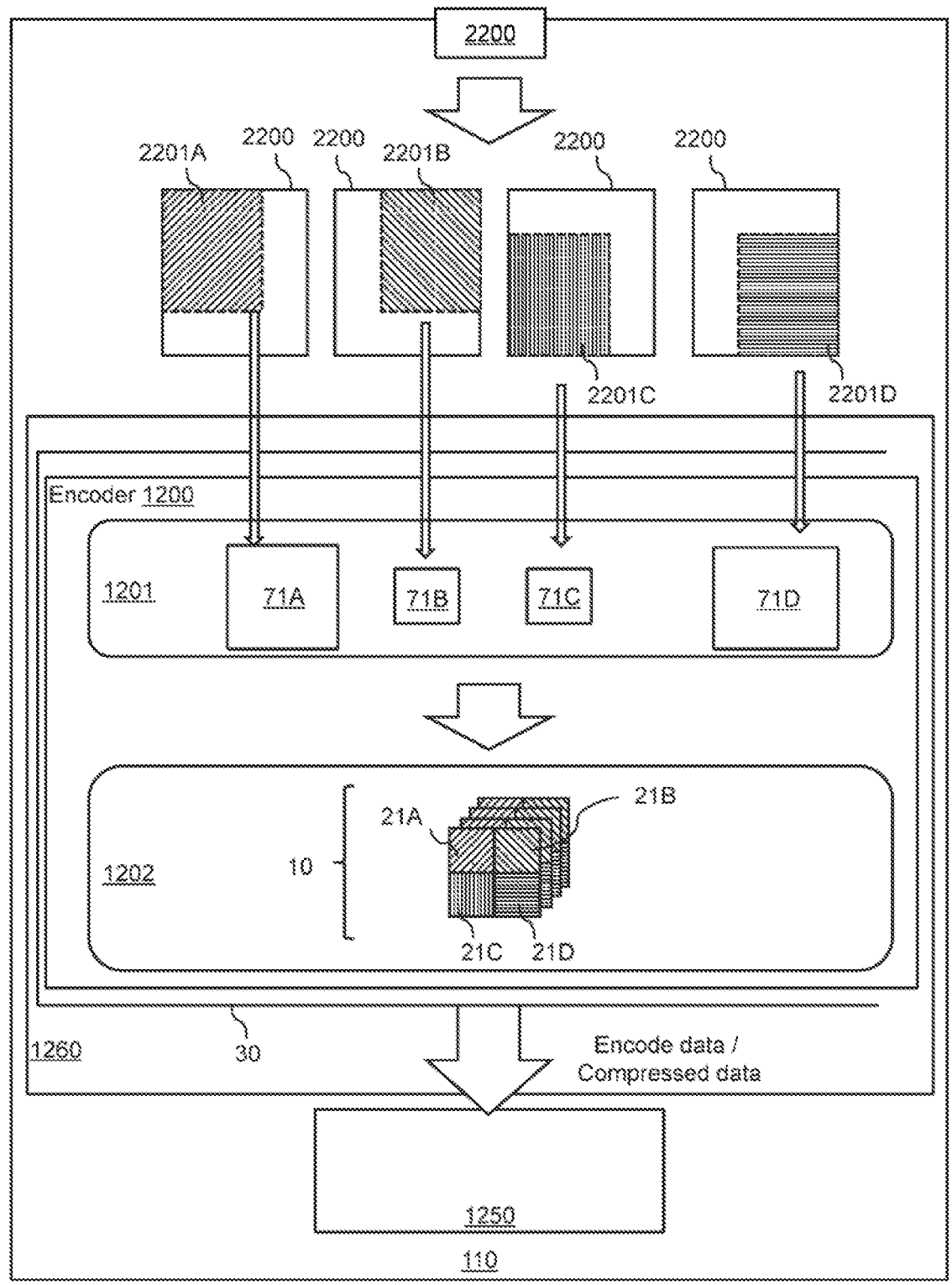
FIG. 12 is a schematic diagram of a storage system including the encoder according to the first embodiment or the second embodiment.

As shown in FIG. 12, the storage system 110 includes a storage device 1250 (for example, at least a memory) and a processor 1260 connected to the storage device 1250. The storage device 1250 may be, for example, one or more storage devices (for example, the DRAM 111 and the persistent storage device 115) in one or more storage nodes 100, and the processor 1260 may be one or more processors 112.

For each of a plurality of data portions 2201 (for example, 2201A to 2201D) acquired from data 2200, the processor 1260 determines a compression operation scale 71 of the data portion 2201 based on a feature of the data portion 2201, and executes a lossy compression operation according to the determined compression operation scale 71, to convert the data portion 2201 into an encoded data portion 21. The processor 1260 generates encoded data 10 of the data 2200 based on a plurality of encoded data portions 21 generated for the plurality of data portions 2201, and stores the encoded data 10 or compressed data thereof into the storage device 1250. Complex data portions are compressed on the scale 71 (for example, 71A), which has a relatively high calculation processing load, and in contrast, simple data portions are compressed on a scale 71 (for example, 71C), which has a relatively low calculation processing load. As a result, the compression operation load can be reduced as a whole while realizing a small amount of data loss. The plurality of data portions 2201 is an example of a plurality of pieces of data. The compression operation is not limited to the lossy compression operation (that is, a lossless compression operation may be adopted). For example, for each of the plurality of pieces of data, the processor 1260 may determine a compression operation scale of the data based on a feature of the data, and may execute a lossy compression operation according to the determined compression operation scale to convert the data into encoded data. The processor 1260 may store the encoded data or compressed data thereof into the storage device 1250. Hereinafter, the data portion 2201 is adopted as an example of the data, and the lossy compression operation is adopted as the compression operation. Alternatively, the data portion 2201 may be read as "data", and the compression operation is not limited to the lossy compression operation.

An example of the data 2200 may be the still image 200, and an example of the data portion 2201 may be the partial image 201. An example of the encoded data portion 21 may be the partial feature map 211, and an example of the encoded data 10 may be the feature map 210.

As described above, the data 2200 may be data other than the still image 200, for example, video data or time-series sensor data. The feature of the data portion 2201 may depend on the type of the data 2200.

The processor 1260 may function as, for example, the encoder 1200 and the storage controller 30. The encoder 1200 may include a compression scale determination unit 1201 and an encoded data generation unit 1202. The storage controller 30 may include the storage controller 1140. The storage controller 30 may input the data 2200 to the compression scale determination unit 1201. For each of the plurality of data portions 2201 acquired from input data 2200, the compression scale determination unit 1201 determines the compression operation scale 71 of the data portion 2201 based on a feature of the data portion 2201, and executes a lossy compression operation according to the determined compression operation scale 71, to convert the data portion 2201 into the encoded data portion 21. The encoded data generation unit 1202 generates the encoded data 10 of the data 2200 based on the plurality of encoded data portions 21 generated for the plurality of data portions 2201. The storage controller 30 may store the encoded data 10 or compressed data thereof into the storage device 1250.

The compression scale determination unit 1201 may include, for example, at least the selector 311, the distributor 319, and the plurality of compression routes 314 shown in FIG. 3. The encoded data generation unit 1202 may include, for example, at least the feature map generator 339 selected from the quantizer 318 and the feature map generator 339 shown in FIG. 3. The encoder 1200 may include, for example, a lossless compressor (not shown) for losslessly compressing the encoded data 10 to output the compressed data.

The compression scale determination unit 1201 may include, for example, at least the neural network 910 selected from the separator 920 and the neural network 910 shown in FIG. 9.

For each of the plurality of data portions 2201, determination of the compression operation scale 71 may be to select a compression route from a plurality of compression routes (for example, the plurality of compression routes 314) which have different compression operation scales 71 and in each of which a lossy compression operation is executed. In the selected compression route, the data portion 2201 may be converted into the encoded data portion 21. Compression is executed in an individual compression route specialized for each data portion group (a set of similar data portions), so that similar compression effects can be achieved with a relatively small-scale compression route (for example, a neural network) rather than a large-scale compression route (for example, a neural network) with general-purpose ability.

The compression operation may be a lossy compression operation. When teacher data is input, for each of a plurality of teacher data portions acquired from the teacher data and each of a plurality of compression routes, the processor 1260 may acquire a teacher data portion, and a decoded teacher data portion that is data acquired by decompressing an encoded teacher data portion acquired by compressing the teacher data portion in the compression route. For each teacher data portion, the processor 1260 may calculate an error between the teacher data portion and each of a plurality of decoded teacher data portions acquired for the teacher data. The processor 1260 may learn selection of a compression route based on the error calculated for each of the plurality of decoded teacher data portions and a compression operation scale of each of the plurality of compression routes. As a result, an optimal compression route can be selected. For each of the plurality of teacher data portions, when a plurality of calculated errors include a corresponding error that is an error equal to or less than a threshold value for a compression route with a relatively small compression operation scale, the processor 1260 may learn to select a compression route corresponding to a minimum corresponding error for a data portion having a feature corresponding to a feature of the teacher data portion. As a result, it can be expected to reduce both the compression operation scale and the error.

Each of the plurality of compression routes may be a convolutional neural network including one or more convolution layers in which convolution operations are executed sequentially. The scale of the convolutional neural network can be reduced according to the feature of the data portion 2201.

The processor 1260 may provide a user interface (for example, the management screen 800). The user interface may be an interface for receiving at least one of the following:
  for at least one compression operation scale, the number of compression routes having the compression operation scale, and
  a definition of at least one compression operation scale (for example, a relation between the compression operation scale and the number of output channels). The processor 1260 may construct a plurality of compression routes based on values input via the user interface. As a result, the encoder 1200 having any configuration by the user can be an encoder that can reduce the calculation processing load as a whole while realizing a small amount of data loss.

For each of the plurality of data portions 2201, the processor 1260 may execute a convolution operation using an input channel other than an input channel to be masked among a plurality of input channels, and a kernel with a predetermined kernel amount. For each of the plurality of data portions 2201, determination of the compression operation scale may be to determine at least one of an input channel to be masked among the plurality of input channels in a convolution layer and the kernel amount of a kernel used in the convolution layer. As a result, the compression operation load can be reduced as a whole while realizing a small amount of data loss even if the compression route is common to a plurality of features of the plurality of data portions 2231.

The compression operation may be a lossy compression operation. For each of the plurality of data portions 2201, the processor 1260 may output, based on a feature of the data portion 2201, a plurality of output values representing the input channel to be masked among the plurality of input channels and the kernel amount by executing a neural network (for example, the neural network 910). When the teacher data is input, the processor 1260 may learn the neural network, based on the kernel amount, the number of channels to be masked, and the error, for each of the plurality of teacher data portions acquired from the teacher data. As a result, at least one of the optimal kernel amount and the optimal number of channels to be masked can be expected for the feature of the data portion 2201. For example, learning may be executed, which includes compressing and decompressing the teacher data portions using each of all combinations of the plurality of input channels as a masked target. Learning may be executed according to which combination has the smallest error when any combination is to be masked. For each of the plurality of teacher data portions, the learning of the neural network may be learning in which a minimization target value according to "minimization target value=first coefficient×kernel amount+second coefficient×(−1×the number of channels to be masked)+error" is minimized. As a result, it can be expected that both the error and the calculation processing scale depending on the kernel amount and the number of channels to be masked are achieved.

Figure 13:
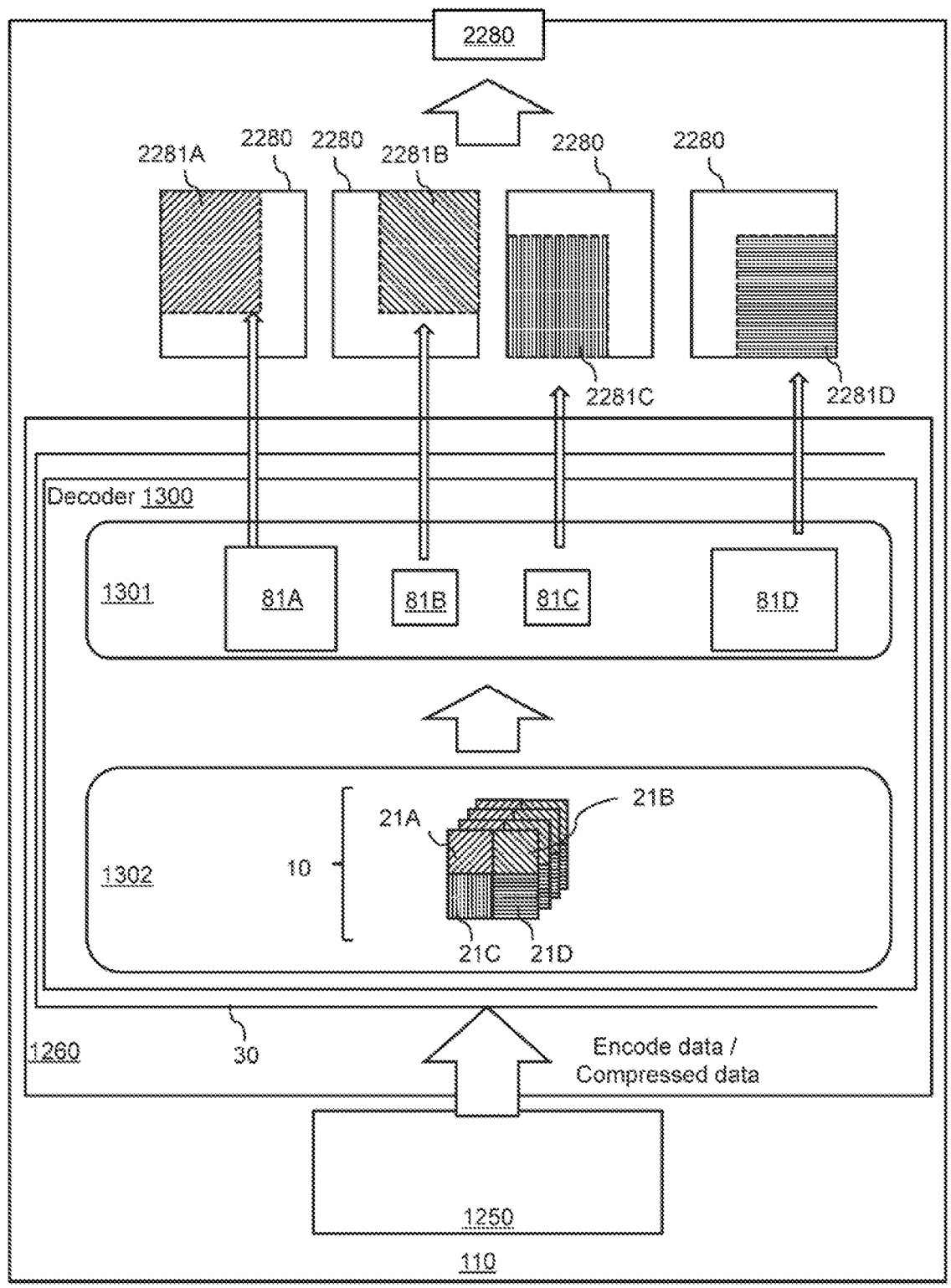
FIG. 13 is a schematic diagram of a storage system including the decoder according to the first embodiment or the second embodiment.

As shown in FIG. 13, the processor 1260 (for example, the storage controller 30) may acquire the encoded data 10 from the storage device 1250 or decompress the compressed data acquired from the storage device 1250 to the encoded data 10. For each of the plurality of encoded data portions 21 acquired from the encoded data 10, the processor 1260 may determine a decompression operation scale 81 of the encoded data portion based on a feature of the encoded data portion 21. The processor 1260 may convert the encoded data portion 21 into a decoded data portion 2281 by executing a decompression operation according to the determined decompression operation scale 81. The processor 1260 may generate decoded data 2280 of the data 2200 based on a plurality of decoded data portions 2281 generated for the plurality of encoded data portions 21. The decompression operation load can be reduced as a whole while realizing a small amount of data loss.

The feature of the encoded data portion 21 may be a feature of the encoded data portion 21 or may indicate at which compression operation scale 71 the encoded data portion 21 has been compressed. In the latter case, the decompression operation scale 81 corresponding to the compression operation scale 71 may be determined.

The processor 1260 may, for example, function as the decoder 1300. The decoder 1300 may include an encoded data portion acquisition unit 1302 and a decompression scale determination unit 1301. The storage controller 30 may input the encoded data 10 to the encoded data portion acquisition unit 1302. The encoded data portion acquisition unit 1302 may acquire the plurality of encoded data portions 21 from the encoded data 10. For each of the plurality of encoded data portions 21, the decompression scale determination unit 1301 may determine the decompression operation scale 81 of the encoded data portion based on the feature of the encoded data portion 21. The decompression scale determination unit 1301 may convert the encoded data portion 21 into the decoded data portion 2281 by executing the decompression operation according to the determined decompression operation scale 81. The decompression scale determination unit 1301 may generate the decoded data 2280 of the data 2200 based on the plurality of decoded data portions 2281 generated for the plurality of encoded data portions 21. The storage controller 30 may output the decoded data 2280.

The encoded data portion acquisition unit 1302 may include, for example, the feature map divider 439 shown in FIG. 4. The decompression scale determination unit 1301 may include, for example, at least the selector 411 selected from the selector 411, the distributor 419, the plurality of decompression routes 414, and the data generator 449 shown in FIG. 4. The decoder 1300 may include a lossless decompressor (not shown) for losslessly decompressing the compressed data to output the encoded data 10.

The decompression scale determination unit 1301 may include, for example, a neural network (not shown) for outputting at least one of a kernel amount of a kernel used for a transposed convolution operation and a channel to be masked in the transposed convolution operation.

For each of the plurality of encoded data portions 21, determination of the decompression operation scale 81 may be to select a decompression route from a plurality of decompression routes (for example, the plurality of decompression routes 414) which have different decompression operation scales and in each of which a decompression operation is executed. In the selected decompression route, the encoded data portion may be converted into a decoded data portion. Decompression is executed in an individual decompression route specialized for each encoded data portion group (a set of similar encoded data portions), so that similar decompression effects can be achieved with a relatively small-scale decompression route (for example, a neural network) rather than a large-scale decompression route (for example, a neural network) with general-purpose ability.

When teacher data is input, for each of a plurality of teacher data portions acquired from the teacher data and each compression route, the processor 1260 may acquire the teacher data portion, and a plurality of decoded teacher data portions acquired by decompressing an encoded teacher data portion, acquired by compressing the teacher data portion in the compression route, in a plurality of decompression routes. The processor 1260 may calculate an error between the teacher data portion and each of the plurality of decoded teacher data portions acquired for the teacher data. The processor 1260 may learn selection of a route combination based on the error calculated for each of the plurality of decoded teacher data portions and compression operation scales and decompression operation scales of a plurality of route combinations (each of the plurality of route combinations may be a combination of any compression route and any decompression route). As a result, it is possible to select the optimal compression route and the optimal decompression route.

For each of the plurality of encoded data portions 21, the processor 1260 may execute a transposed convolution operation using an input channel other than an input channel to be masked among a plurality of input channels, and a kernel with a predetermined kernel amount. For each of the plurality of encoded data portions 21, determination of the decompression operation scale 81 may be to determine at least one of an input channel to be masked among the plurality of input channels in a transposed convolution layer and the kernel amount of a kernel used in the transposed convolution layer. As a result, a decompression operation load can be reduced as a whole while realizing a small amount of data loss even if the decompression route is common to a plurality of features of the plurality of encoded data portions 21.

What is claimed is:

1. A storage system comprising:
a storage device; and
a processor connected to the storage device,
wherein, for each of a plurality of pieces of data, the processor:
  determines a compression operation scale of the data based on a feature of the data;
  executes a compression operation according to the determined compression operation scale to convert the data into encoded data; and
  stores the encoded data or compressed data thereof into the storage device, and
wherein for each of the plurality of pieces of data:
  the processor executes convolution operation using an input channel other than an input channel to be masked of a plurality of input channels, and a kernel with a predetermined kernel amount, and
  determination of the compression operation scale is to determine at least one of an input channel to be masked among the plurality of input channels in a convolution layer and a kernel amount of a kernel used in the convolution layer thereby reducing a compression operation load while minimizing an amount of data loss.

2. The storage system according to claim 1, wherein for each of the plurality of pieces of data,
  determination of the compression operation scale is to select a compression route from a plurality of compression routes which have different compression operation scales and in each of which a compression operation is executed, and
  the data is converted into the encoded data in the selected compression route.

3. The storage system according to claim 2, wherein the compression operation is a lossy compression operation, and
  when teacher data is input, for each of a plurality of pieces of teacher data and for each of the plurality of compression routes, the processor
    acquires the teacher data, and decoded teacher data that is data acquired by decompressing encoded teacher data acquired by compressing the teacher data in the compression route,
    calculates an error between each of the plurality of pieces of teacher data and each of the plurality of pieces of decoded teacher data, and
    learns selection of a compression route based on the error calculated for each of the plurality of pieces of decoded teacher data, and the compression operation scale of each of the plurality of compression routes.

4. The storage system according to claim 3, wherein, for each of the plurality of pieces of teacher data, when a plurality of calculated errors includes a corresponding error that is an error equal to or less than a threshold value for a compression route corresponding to a minimum corresponding error for data having a feature corresponding to a feature of the teacher data.

5. The storage system according to claim 2, wherein
each of the plurality of compression routes is a convolutional neural network including one or more convolution layers in which convolution operations are executed sequentially.

6. The storage system according to claim 2, wherein
the processor provides a user interface,
the user interface is an interface configured to receive at least one of following:
  for at least one compression operation scale, a number of compression routes having the compression operation scale, and
  a definition of at least one compression operation scale, and
the processor constructs the plurality of compression routes based on a value input via the user interface.

7. The storage system according to claim 1, wherein
the compression operation is a lossy compression operation,
for each of the plurality of pieces of data, the processor outputs, based on a feature of the data, a plurality of output values representing the input channel to be masked among the plurality of input channels and the kernel amount by executing a neural network, and
when teacher data is input, the processor learns the neural network, based on the kernel amount, a number of channels to be masked, and an error, for each of a plurality of pieces of teacher data.

8. The storage system according to claim 7, wherein
for each of the plurality of pieces of teacher data, the learning of the neural network is a learning in which a minimization target value according to "minimization target value=first coefficient×kernel amount+second coefficient×(−1×the number of channels to be masked)+error" is minimized.

9. The storage system according to claim 2, wherein
the processor acquires the encoded data from the storage device, or decompresses compressed data acquired from the storage device into the encoded data,
for each of a plurality of pieces of encoded data acquired from the encoded data, the processor
  determines a decompression operation scale of the encoded data based on a feature of the encoded data, and
  executes a decompression operation according to the determined decompression operation scale to convert the encoded data into decoded data,
the processor generates decoded data of the data based on a plurality of pieces of decoded data generated for the plurality of pieces of encoded data,
for each of the plurality of pieces of encoded data,
  determination of a decompression operation scale is to select a decompression route from a plurality of decompression routes which have different decompression operation scales and in each of which a decompression operation is executed, and
  the encoded data is converted into decoded data in the selected decompression route.

10. The storage system according to claim 9, wherein
the compression operation is a lossy compression operation,
when teacher data is input, for each of a plurality of pieces of teacher data and for each of the plurality of compression routes, the processor
  acquires the teacher data, and a plurality of pieces of decoded teacher data acquired by decompressing encoded teacher data, acquired by compressing the teacher data in the compression route, in the plurality of decompression routes,
  calculates an error between the teacher data and each of the plurality of pieces of decoded teacher data acquired for the teacher data, and
  learns selection of a route combination based on the error calculated for each of the plurality of pieces of decoded teacher data, and compression operation scales and decompression operation scales of a plurality of route combinations, and
each of the plurality of route combinations is a combination of any compression route and any decompression route.

11. The storage system according to claim 1, wherein
the processor acquires the encoded data from the storage device, or decompresses compressed data required from the storage device into the encoded data,
for each of the plurality of pieces of encoded data, the processor
  determines a decompression operation scale of the encoded data based on a feature of the encoded data, and
  executes a decompression operation according to the determined decompression operation scale to convert the encoded data into decoded data,
the processor generates decoded data of the data based on a plurality of pieces of decoded data generated for the plurality of pieces of encoded data,
for each of the plurality of pieces of encoded data, the processor executes a transposed convolution operation using an input channel other than an input channel to be masked among a plurality of input channels, and an other kernel with an other predetermined kernel amount, and
for each of the plurality of pieces of encoded data, determination of a decompression operation scale is to determine at least one of an input channel to be masked among the plurality of input channels in a transposed convolution layer and an other kernel amount of the kernel used in the transposed convolution layer.

12. The storage system according to claim 1, wherein
the processor acquires the encoded data from the storage device, or decompresses compressed data acquired from the storage device into the encoded data, and
for each of a plurality of pieces of encoded data acquired from the encoded data, the processor
  determines a decompression operation scale of the encoded data based on a feature of the encoded data, and
  executes a decompression operation according to the determined decompression operation scale to convert the encoded into decoded data.

13. A storage control method comprising:
for each of a plurality of pieces of data, as executed by a processor:
  determining a compression operation scale of the data based on a feature of the data;
  executing a compression operation according to the determined compression operation scale to convert the data into encoded data;
  generating encoded data of the data based on a plurality of pieces of encoded data generated for the plurality of pieces of data; and
  storing the encoded data or compressed data thereof into a storage device, wherein for each of the plurality of pieces of data:
the processor executes convolution operation using an input channel other than an input channel to be masked of a plurality of input channels, and a kernel with a predetermined kernel amount, and
determination of the compression operation scale is to determine at least one of an input channel to be masked among the plurality of input channels in a convolution layer and a kernel amount of a kernel used in the convolution layer thereby reducing a compression operation load while minimizing an amount of data loss.

\* \* \* \* \*